US011378473B2

(12) United States Patent
Kakaley et al.

(10) Patent No.: US 11,378,473 B2
(45) Date of Patent: Jul. 5, 2022

(54) METHODS AND SYSTEMS FOR MEASURING PARAMETERS OF ROTATING SHAFTS AND COUPLINGS

(71) Applicant: LORD Corporation, Cary, NC (US)

(72) Inventors: Daniel Kakaley, Cary, NC (US); Russell Altieri, Holly Springs, NC (US); Mark Jolly, Raleigh, NC (US); Victor Zaccardo, Durham, NC (US)

(73) Assignee: Lord Corp, Cary, NC (US)

( * ) Notice: Subject to any disclaimer, the term of this patent is extended or adjusted under 35 U.S.C. 154(b) by 317 days.

(21) Appl. No.: 16/604,702

(22) PCT Filed: Apr. 17, 2018

(86) PCT No.: PCT/US2018/027933
§ 371 (c)(1),
(2) Date: Oct. 11, 2019

(87) PCT Pub. No.: WO2018/195053
PCT Pub. Date: Oct. 25, 2018

(65) Prior Publication Data
US 2020/0378849 A1    Dec. 3, 2020

Related U.S. Application Data

(60) Provisional application No. 62/486,170, filed on Apr. 17, 2017.

(51) Int. Cl.
*G01L 3/00* (2006.01)
*G01L 3/08* (2006.01)
(Continued)

(52) U.S. Cl.
CPC ............... *G01L 3/08* (2013.01); *G01B 7/312* (2013.01); *G01B 11/272* (2013.01); *G01D 5/14* (2013.01);
(Continued)

(58) Field of Classification Search
CPC ........... G01L 3/08; G01L 3/101; G01B 7/312; G01B 11/272; G01D 5/14; G01D 5/24; G01D 5/3473
See application file for complete search history.

(56) References Cited

U.S. PATENT DOCUMENTS 4,183,242 A * 1/1980 Brown .................... G01L 3/101
73/862.328
4,874,053 A * 10/1989 Kimura .................... B62D 6/10
180/443
(Continued)

FOREIGN PATENT DOCUMENTS

DE        694 20 781       5/2000
EP        0 632 250        1/1995
(Continued)

OTHER PUBLICATIONS

Garshelis, I.J., et al., "Development of a Non-Contact Torque Transducer for Electric Power Steering Systems," SAE Technical Paper Series, vols. Sensors and Actuators (SP-903), pp. 173-182, 1992.
(Continued)

*Primary Examiner* — Max H Noori
(74) *Attorney, Agent, or Firm* — McAfee & Taft

(57) ABSTRACT

Systems and methods for measuring displacement parameters of rotating shafts and couplings are disclosed. In some aspects, a measurement system includes a shaft extended in a longitudinal direction and a target wheel configured to rotate with the shaft. The target wheel includes sensor targets circumferentially distributed around the target wheel. Some of the targets are slanted in the longitudinal direction and some of the targets are parallel to the longitudinal direction. The measurement system includes a sensor array including at least three sensors mounted radially around the shaft and configured to detect the sensor targets as the target wheel (Continued)

rotates with the shaft. The measurement system includes a controller configured to receive sensor signals from the sensors and determine, based on the sensor signals, at least an axial displacement measurement of the shaft in the longitudinal direction and a radial displacement measurement of the shaft.

20 Claims, 20 Drawing Sheets

(51) Int. Cl.
G01B 7/312 (2006.01)
G01B 11/27 (2006.01)
G01D 5/14 (2006.01)
G01D 5/24 (2006.01)
G01D 5/347 (2006.01)
G01L 3/10 (2006.01)

(52) U.S. Cl.
CPC ............. *G01D 5/24* (2013.01); *G01D 5/3473* (2013.01); *G01L 3/101* (2013.01)

(56) References Cited

U.S. PATENT DOCUMENTS

| | | | | |
|---|---|---|---|---|
| 5,514,952 | A * | 5/1996 | Parkinson | G01B 7/02 324/207.24 |
| 6,087,734 | A | 7/2000 | Maeda et al. | |
| 2002/0035877 | A1 * | 3/2002 | Tokumoto | G01L 5/221 73/862.333 |
| 2002/0153875 | A1 * | 10/2002 | Maeda | G01L 3/104 324/105 |
| 2003/0215168 | A1 * | 11/2003 | Krabill | G01P 3/443 384/448 |
| 2017/0129532 | A1 * | 5/2017 | Yoshida | B62D 5/0403 |
| 2017/0341681 | A1 * | 11/2017 | Shiino | F16H 25/2418 |
| 2017/0349211 | A1 * | 12/2017 | Shiino | B62D 15/0235 |
| 2021/0247259 | A1 * | 8/2021 | Altieri | G01L 3/101 |

FOREIGN PATENT DOCUMENTS

| | | |
|---|---|---|
| EP | 1 193 484 | 4/2002 |
| EP | 1 300 662 | 4/2003 |
| GB | 2 202 949 | 10/1988 |

OTHER PUBLICATIONS

Garshelis, I.J., et al., "A Single Transducer for Non-Contact Measurement of the Power, Torque and Speed of a Rotating Shaft," SAE Technical Paper Series, vols. Sensors and Actuators (SP-1066), pp. 57-65, 1995.

Garshelis, I.J., et al., "Development of a Magnetoelastic Torque Transducer for Automotive Transmission Applications," SAE Technical Paper Series, vols. Sensors and Actuators (SP-1220), pp. 35-44, 1997.

Gierut, J., et al., "Automotive Powertrain & Chassis Torque Sensor Technology," Honeywell International Inc., 6 pages, 2005.

Hall and VR, "Comparing Speed Sensor Technologies," Cherry Electrical Products, 3 pages.

Himmelstein S&C., "Avoiding the destructive effects of torsional resonance," in Technical Memorandum 8150, 2007.

Napert, Greg, TPE331 Strain Gage Torque System, Article Jul. 1, 1998, http://www.aviationpros.com/article/10389107/tpe331-strain-gage-torque-system, 12 pages, accessed Apr. 2, 2017.

Pantaleo, Antonio, et al., An Optical Torque Transducer for High-Speed Cutting, Institute of Physics Publishing Measurement Science and Technology, Meas. Sci. Technol. 17 (2006) 331-339 doi:10.1088/0957-0233/17/2/014.

Tullis, I. D. C., et al., "Shaft Tilt Sensitivity of the Laser Torquemeter" SPIE Proceedings, SPIE vol. 3411 • 0277-786X198, pp. 309-316, Downloaded From: http://proceedings.spiedigitallibrary.org/ on Apr. 17, 2017 Terms of Use http://spiedigitallibrary.org/ss/termsofuse.aspx.

How Does The Torque indication system measure Torque in the helicopters and turbo prop aircrafts?, 6 pages, http://www.askacfi.com/23366/how-does-the-torque-indication-system-measure-torque-in-the-helicopters-and-turbo-prop-aircrafts.htm.

Real-Time Engine Torque Measurement, real-time engine torque measurement—Engine & fuel engineering—Eng-Tips, http://www.eng-tips.com/viewthread.cfm?qid=239820, 3 pgs, accessed Apr. 2, 2017.

* cited by examiner

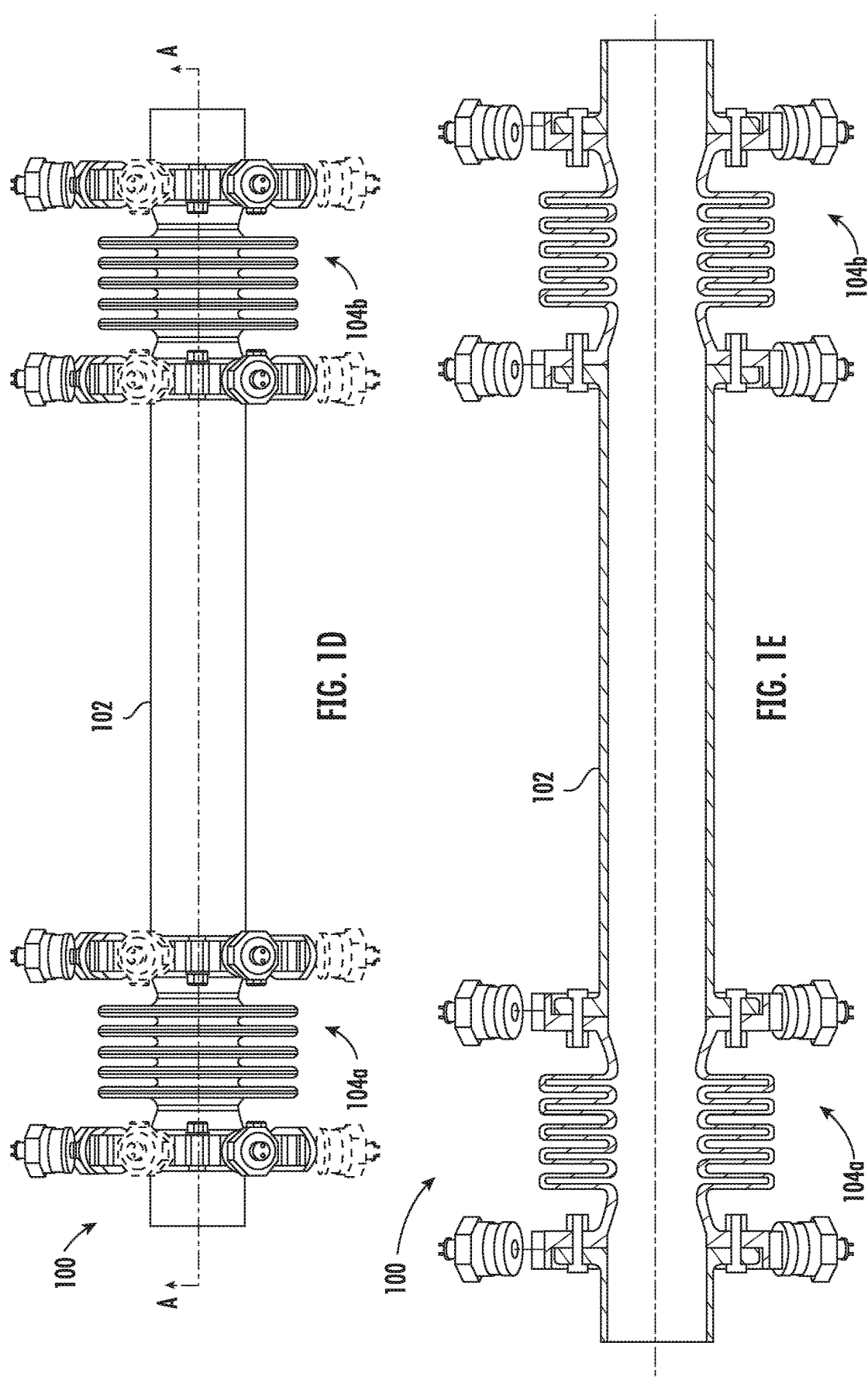

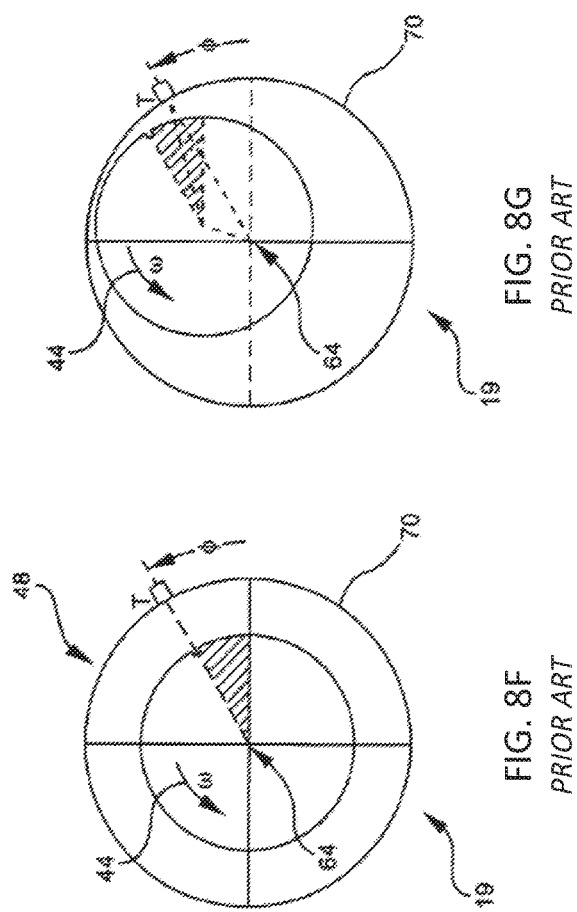
FIG. 8F
PRIOR ART
FIG. 8G
PRIOR ART
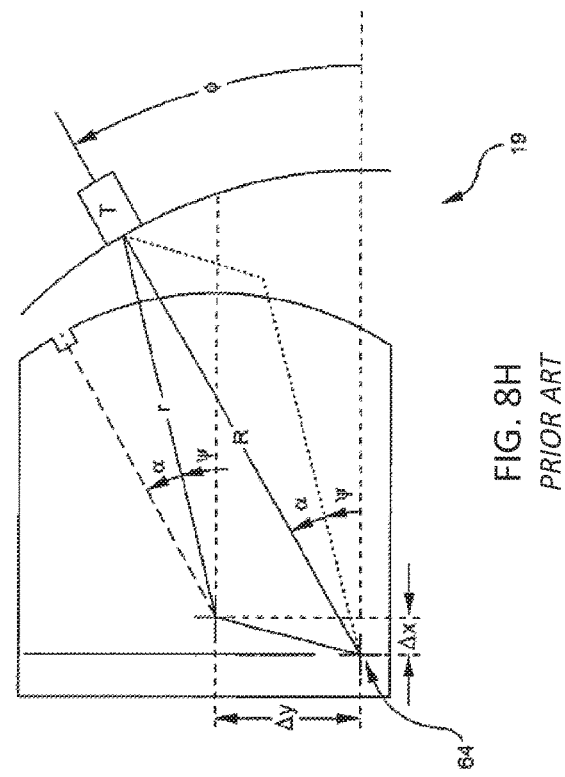
FIG. 8H
PRIOR ART

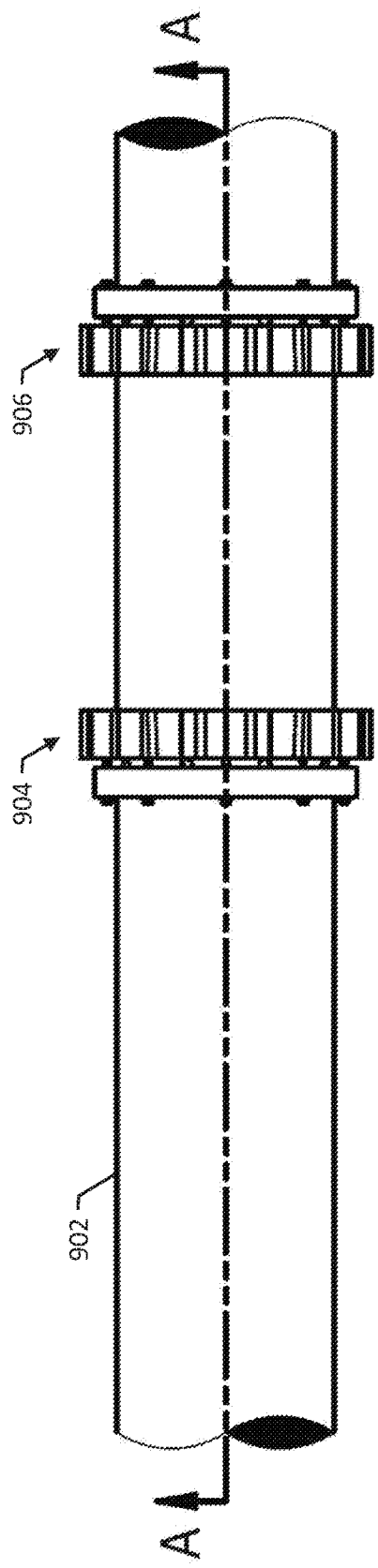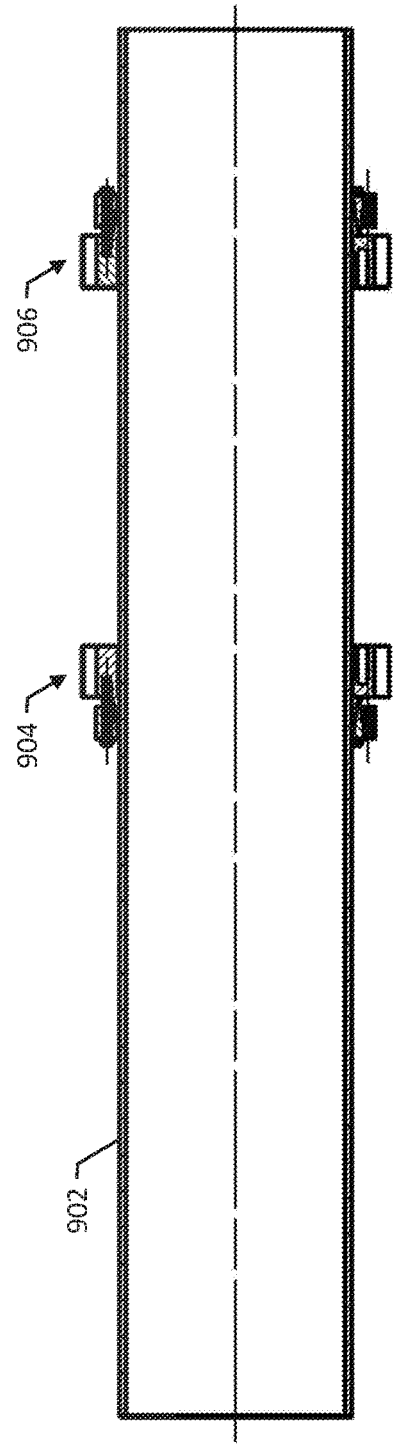
FIG. 9C
SECTION A-A
FIG. 9D

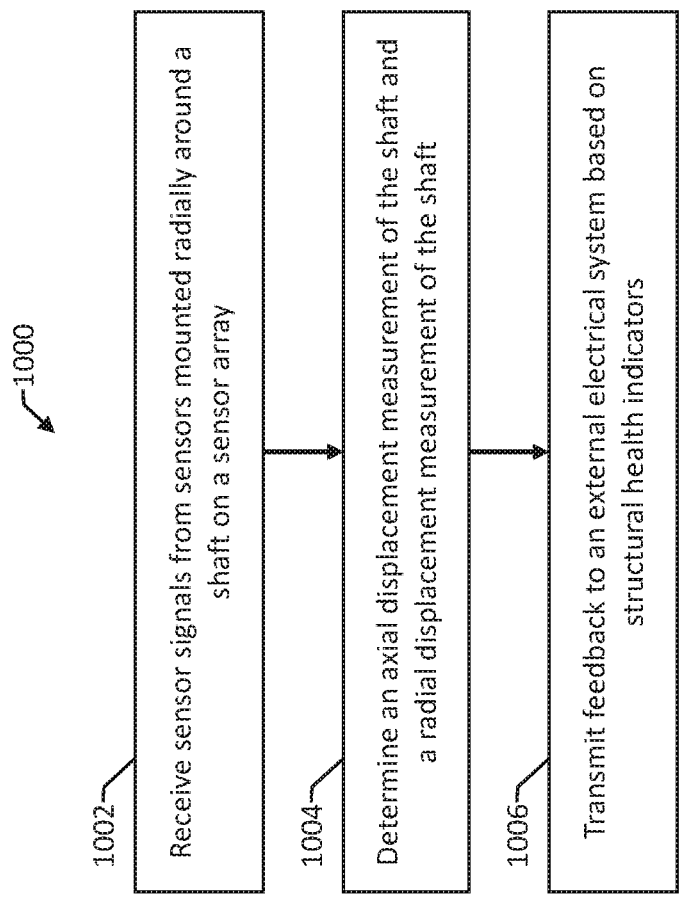

METHODS AND SYSTEMS FOR MEASURING PARAMETERS OF ROTATING SHAFTS AND COUPLINGS

CROSS-REFERENCE TO RELATED APPLICATIONS

This application claims the benefit of U.S. Provisional Patent Application Ser. No. 62/486,170 filed Apr. 17, 2017, the disclosure of which is incorporated herein by reference in its entirety.

TECHNICAL FIELD

The subject matter described in this specification relates to methods and systems for measuring displacement parameters of rotating shafts and couplings.

BACKGROUND

Many types of systems include a rotatable shaft. For example, electric motors, internal combustion engines, and transmissions of vehicles and manufacturing systems typically include one or more drive shafts. Shafts can be coupled together with rotational couplings, and some rotational couplings are flexible. For example, bellows couplings allow for twisting and misalignment between two shafts. Conventional measurement systems for monitoring rotational couplings measure twist, torque, and misalignment at rotational couplings using, e.g., sensors angularly spaced around the coupling. These conventional measurement systems, however, may have excess noise on the torque signal, and various conventional measurement systems lack an economical system for measuring both twist, torque, and misalignment and other parameters such as axial displacement. There is a need for methods and systems for measuring twist and axial displacement of rotating shafts and couplings.

SUMMARY

In some aspects, a measurement system includes a shaft extended in a longitudinal direction and a target wheel configured to rotate with the shaft. The target wheel includes sensor targets circumferentially distributed around the target wheel. Some of the targets are slanted in the longitudinal direction and some of the targets are parallel to the longitudinal direction. The measurement system includes a sensor array including at least three sensors mounted radially around the shaft and configured to detect the sensor targets as the target wheel rotates with the shaft. The measurement system includes a controller configured to receive sensor signals from the sensors and determine, based on the sensor signals, at least an axial displacement measurement of the shaft in the longitudinal direction and a radial displacement measurement of the shaft.

In some aspects, a method performed by a controller of a measurement system includes receiving sensor signals from each of at least three sensors mounted radially around a shaft on a sensor array. The shaft is extended in a longitudinal direction, and the sensor array is configured to position the at least three sensors for detecting sensor targets circumferentially distributed around a target wheel as the target wheel rotates with the shaft. The sensor targets include a first plurality of targets that are slanted in the longitudinal direction and a second plurality of targets that are parallel to the longitudinal direction. The method includes determining, based on the sensor signals, at least an axial displacement measurement of the shaft in the longitudinal direction and a radial displacement measurement of the shaft.

BRIEF DESCRIPTION OF THE DRAWINGS

FIGS. 1A-H illustrate an example mechanical environment for measurement systems that measure parameters of shafts and couplings.

FIGS. 8D-8H show the use of target timing measurements to determine a twist angle.

FIGS. 9A-9D illustrate an example shaft having two target wheels and on the shaft.

FIG. 10 is a flow diagram of an example method 1000 performed by a controller of a measurement system.

DETAILED DESCRIPTION

This specification describes systems and methods for measuring displacement parameters of rotating shafts and couplings. The parameters can, for example and without limitation, include twist, axial displacement, and radial displacement of rotating shafts and couplings in a radial plane of the shafts and couplings. The measurements can be used to determine torque based on the twist measurement, parallel and angular misalignment, axial strain and displacement, run-out, whirl, and torsional dynamics. With some rotational couplings, it is useful, e.g., for safety purposes and for maintenance scheduling, to ensure that high speed machinery is not undergoing significant misalignments and/or axial displacements while rotating at high speeds. These correspond to the axial and bending strains of the coupling, but have the added benefit of not needing a rotating frame electronics or gauges.

FIGS. 1A-F illustrate an example mechanical environment 100 for measurement systems that measure parameters of shafts and couplings. The mechanical environment 100 includes a shaft 102 and two rotational couplings 104a-b to different shafts. The rotational couplings 104a-b are generally flexible couplings that allow some twisting and misalignment between shafts. For example, the rotational couplings 104a-b are bellows couplings in some embodiments. In other embodiments (not shown), the two rotational couplings 104a-b may be a rigid coupling, a semi-rigid coupling, or a flexible coupling.

The mechanical environment 100 of FIGS. 1A-F includes two rotational couplings 104a-b; however, in general, a measurement system as described can be used in mechanical environments with one coupling or in mechanical environments with more than two couplings. In some examples, a measurement system is used with a shaft segment, i.e., where there is no coupling.

Figure 1A:
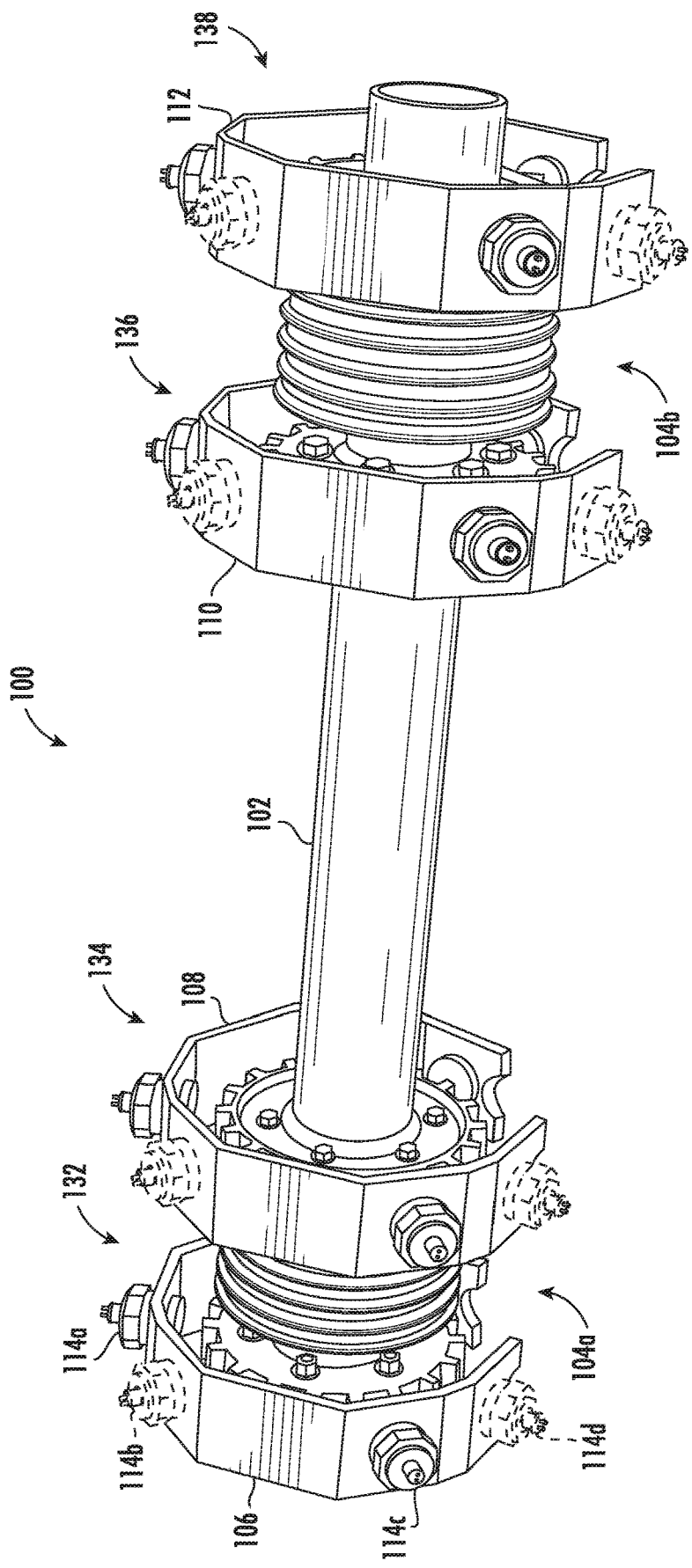
Figure 1B:
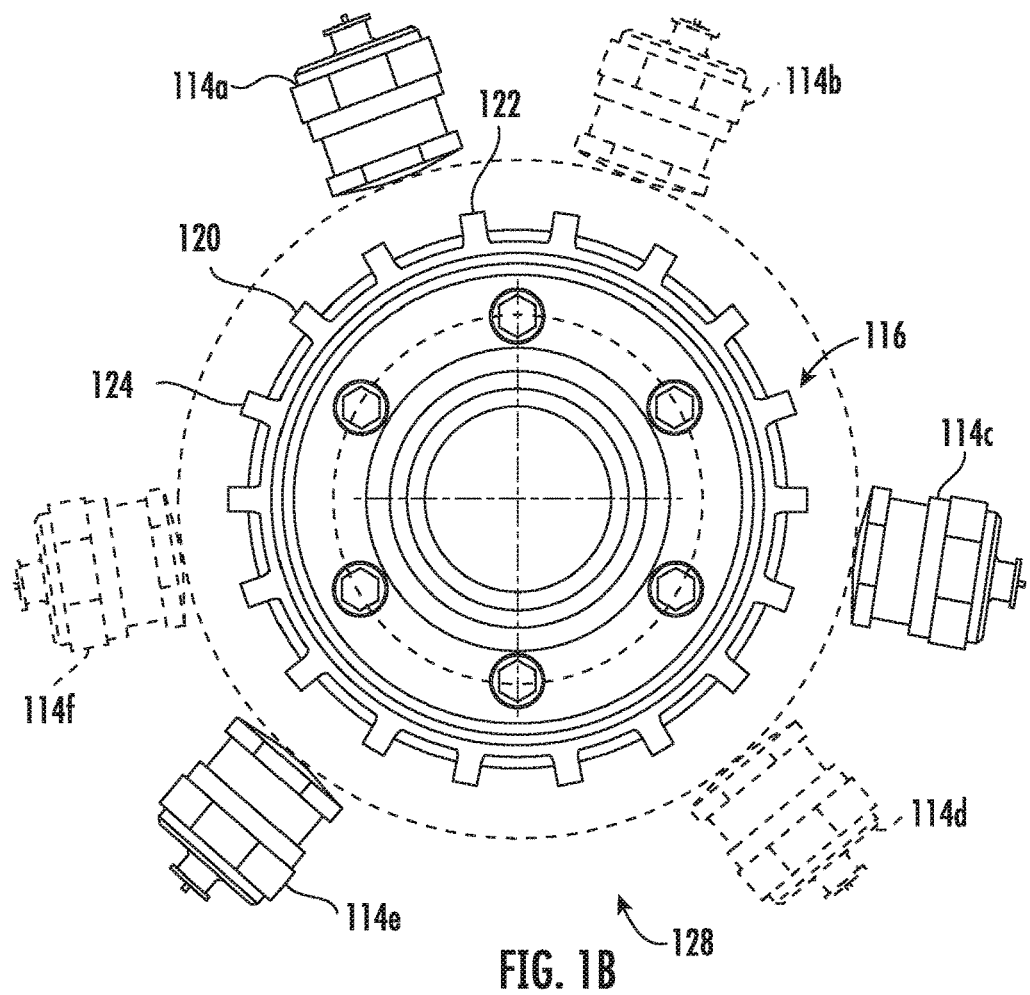

FIG. 1A shows a perspective view of the mechanical environment 100. As illustrated, the mechanical environment 100 includes at least two planes of sensors and at least three sensors in each plane. As illustrated in FIG. 1A, a first two planes of sensors include sensor arrays 106, 108, and a second two planes of sensors includes sensor arrays 110, 112. Additional sensor arrays may be added as necessary. All sensor arrays 106, 108, 110, 112 are positioned proximate the shaft 102 without touching shaft 102, creating a space such as an air gap, which is illustrated in FIG. 1B, and generally do not rotate with the shaft. The first sensor array 106 is illustrated as being disposed at a first end 132 of the first rotational coupling 104a, and the second sensor array 108 is illustrated as being disposed at a second end 134, opposite the first end 132, of the first rotational coupling 104a. Similarly, the third sensor array 110 is illustrated as being disposed at a first end 136 of the second rotational coupling 104b, and the fourth sensor array 112 is illustrated as being disposed at a second end 138, opposite the first end 136, of the second rotational coupling 104b. The sensor array may be affixed to machine structure such as a housing or shroud that encloses the shaft 102, or it may be affixed to a cradle (not shown).

Each sensor array includes sensors mounted radially around the shaft 102. For purposes of illustration, the first sensor array 106 will be described in further detail; the other sensor arrays 108, 110, 112 are typically configured identically or similarly to the first sensor array 106. Any additional sensor arrays will be similarly configured. The first sensor array 106 includes at least three sensors 114a, 114c, 114e in a first plane mounted radially around the shaft 102. For example, the first sensor array 106 can include three sensors 114a, 114c, and 114e mounted uniformly at a constant circumferential spacing. For additional redundancy, the first sensor array 106 can also include three additional sensors 114b, 114d, and 114f mounted uniformly at the constant circumferential spacing and offset from the other three sensors 114a, 114c, and 114e. As illustrated in the FIGS., sensors 114b, 114d, and 114f are shown as dashed lines to illustrate these sensors being redundant. In general, the first sensor array 106 can include at least three sensors in each plane, and include any number of additional sensors to improve reliability, accuracy, safety-critical redundancy, etc. Furthermore, the sensors can be mounted in any circumferential pattern including non-uniform circumferential spacing.

Figure 1C:
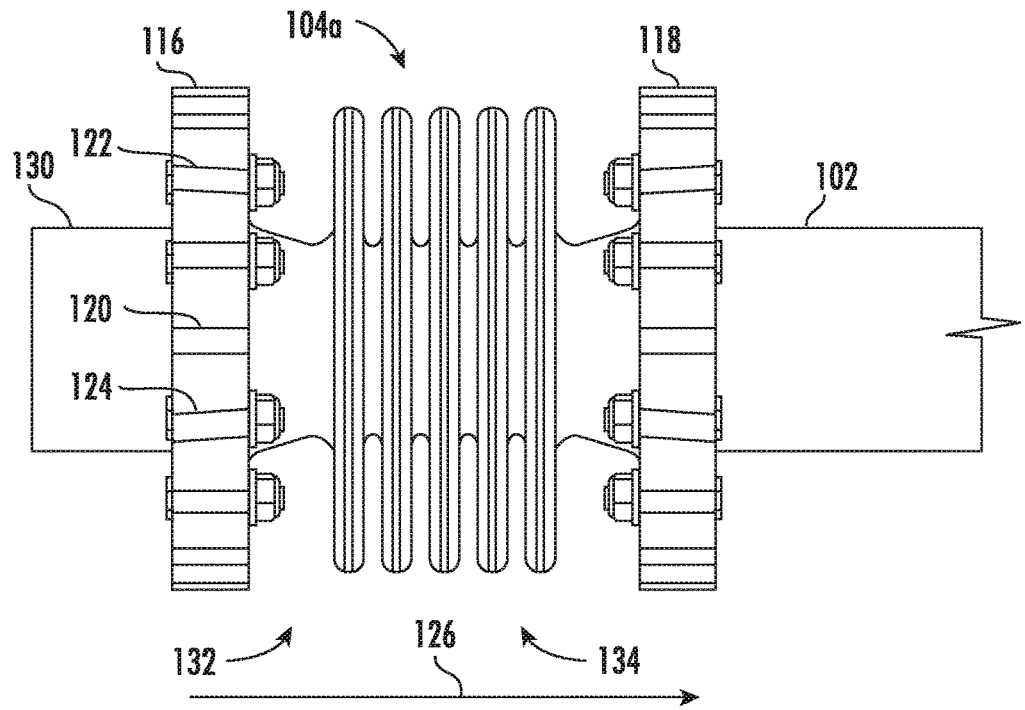

FIG. 1B shows a top view of the sensors 114a-f, and FIG. 1C shows a side view of the first rotational coupling 104a including a first target wheel 116 at the first end 132 of the rotational coupling 104a and a second target wheel at the second end 134 of the rotational coupling. FIG. 1B illustrates that the sensors 114a-f are mounted radially in a radial plane 128 of the shaft 102, and FIG. 1C illustrates that the shaft 102 extends in a longitudinal direction 126 and that the first rotational coupling 104a couples the shaft 102 to a different shaft 130.

Referring to FIG. 1C, the target wheels 116, 118 each include sensor targets such as the teeth illustrated on target wheels 116, 118, mounted radially around the shaft 102. For purposes of illustration, the first target wheel 116 will be described in further detail. Target wheel 118 is typically configured identically or similarly to the first sensor array.

The second rotational coupling 104b typically includes target wheels configured identically or similarly to the first rotational coupling 104a.

The first target wheel 116 is configured to rotate with the shaft 130 so that the first target wheel 116 is rigidly fixed to the shaft 130. For example, the first target wheel 116 is rigidly integrated with the first rotational coupling 104a in some embodiments. In this example, the first target wheel 116 is a toothed wheel having teeth radially mounted around the target wheel. In the illustrated example, the first target wheel 116 includes targets that are parallel to the longitudinal direction 126, e.g., target 120, and targets that are slanted in the longitudinal direction 126, e.g., targets 122, 124. Alternatively, the targets may be slots, or other features that are detectable by the sensor arrays.

In some of the examples, some of the slanted targets, e.g., target 122, are slanted in opposite orientations, in the longitudinal direction 126, to some of the other slanted targets, e.g., target 124. In general, the targets are disposed radially around the first target wheel 116 in an alternating fashion. In the example illustrated in FIG. 1C, the first sensor wheel 116 includes, in a radial direction around the shaft 130, two parallel targets followed by a slanted target slanted in a first orientation, then two parallel targets followed by a slanted target slanted in a second orientation opposite the first orientation, and repeating thereafter.

Referring to FIG. 1B, the sensors 114a-f are mounted radially around the first target wheel 116 and configured to detect the sensor targets as the target wheel 116 rotates with the shaft 130. In one example embodiment, the sensors 114a-f can be used for measuring timing of target passage to infer shaft twist or axial and radial displacement.

The sensor targets are, for example, conductive targets, optical targets, ferrous targets, or combinations of these on the first target wheel 116 in some embodiments. Each of the sensors 114a-f at least comprises a passive inductive sensor such as a variable reluctance (VR) sensor, a non-contact active inductive sensor such as a differential variable reluctance transducer (DVRT), an optical sensor, a microwave sensor, a capacitive proximity sensor, a Hall sensor, or any other appropriate type of sensor. In some embodiments, the sensor targets are uniformly spaced circumferentially around the first target wheel 116. In some other embodiments, the sensor targets are placed with non-uniform spacing around the first target wheel 116.

Figure 1F:
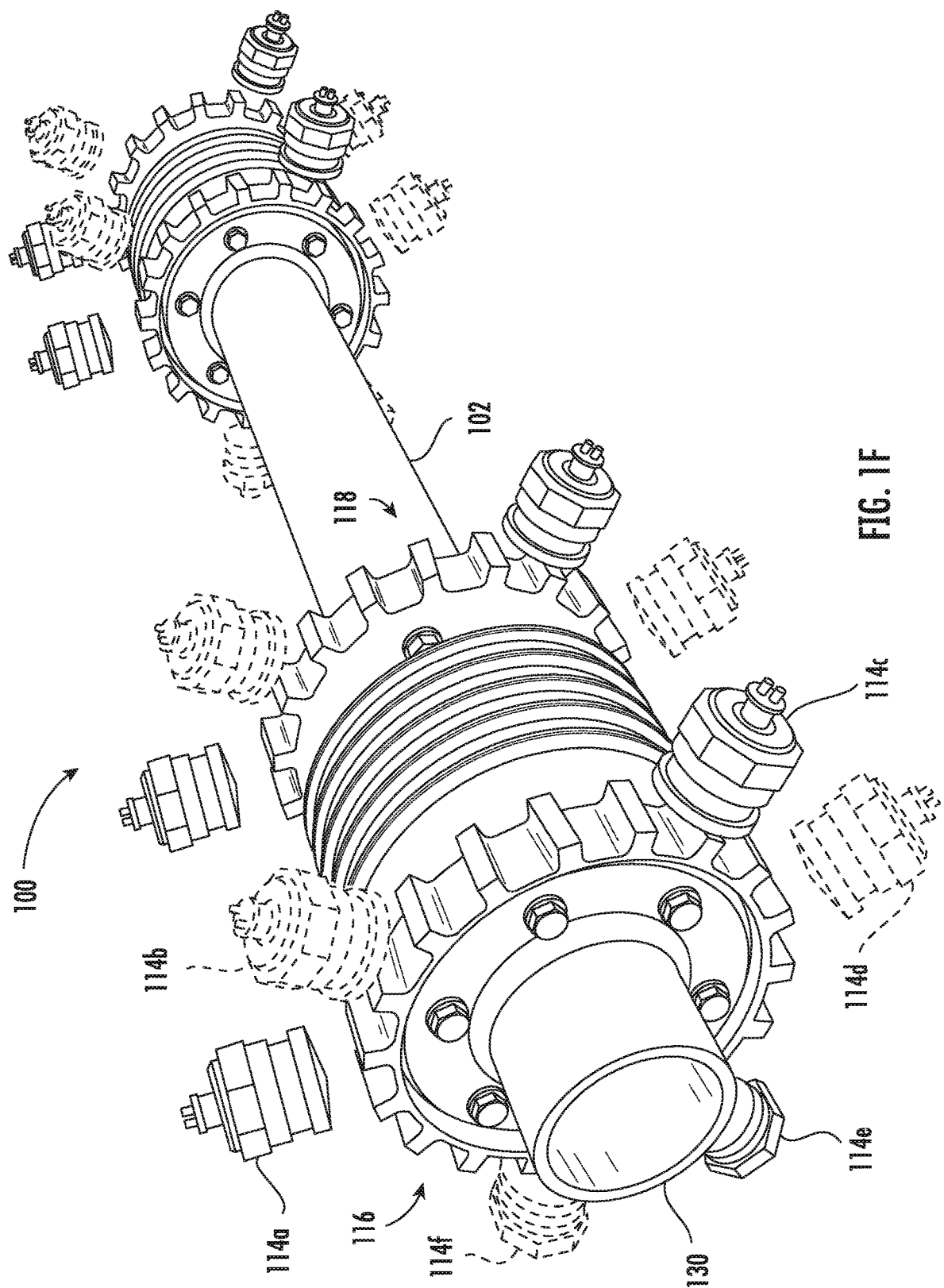
Figure 1G:
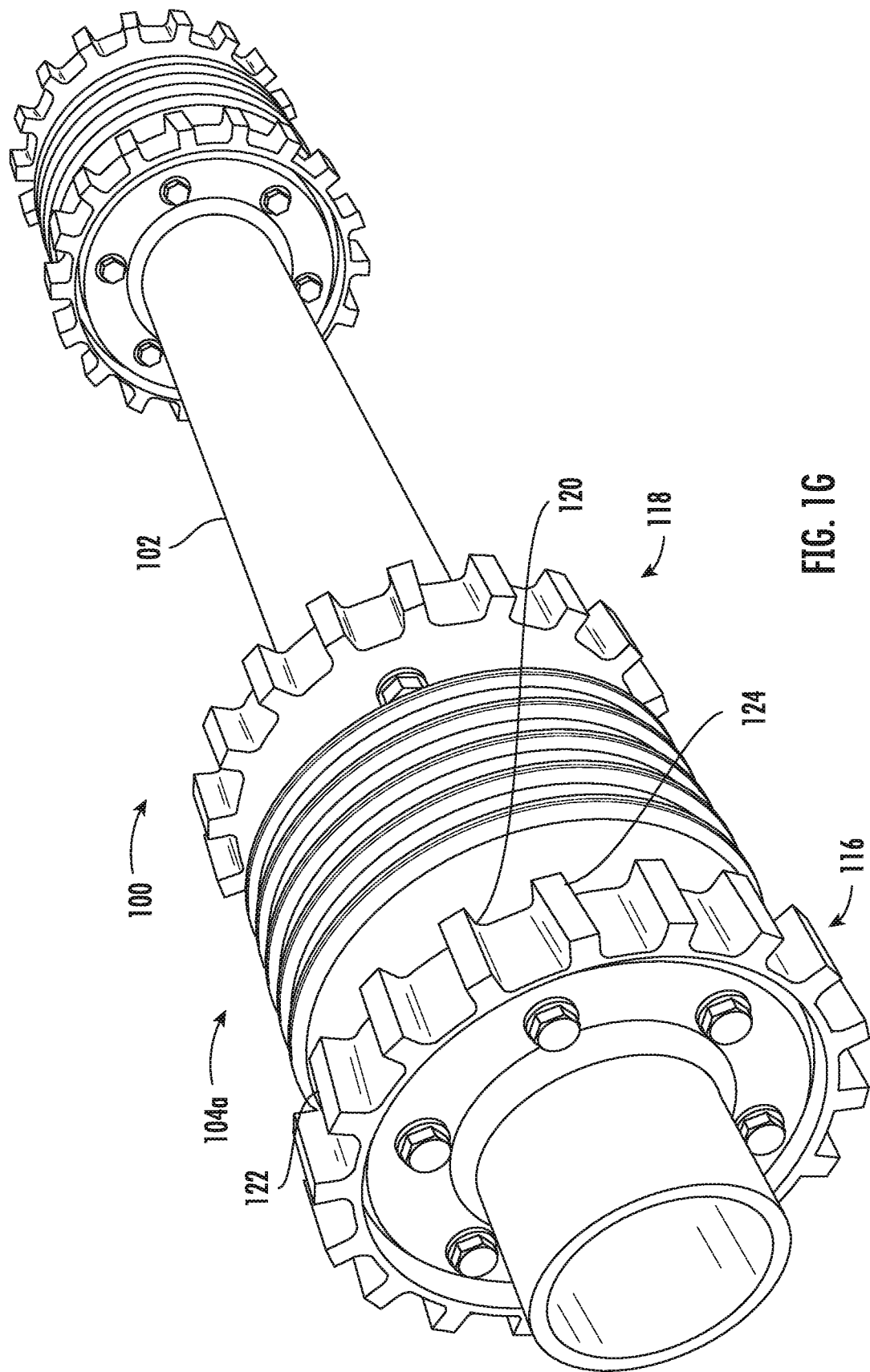
Figure 1H:
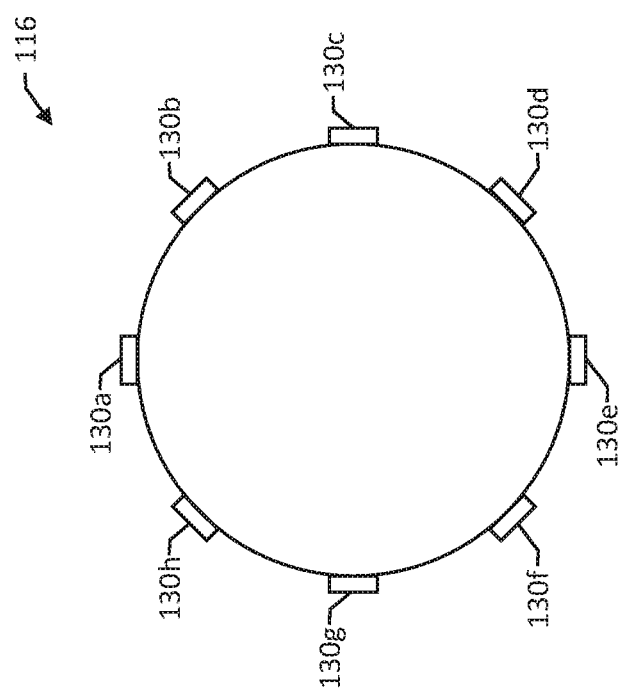

FIG. 1D is a side view of the mechanical environment 100 including the shaft 102 and the rotational couplings 104a-b. FIG. 1E is a cross-sectional view of the mechanical environment 100 including the shaft 102 and the rotational couplings 104a-b. FIG. 1F is a partially exploded perspective view of the mechanical environment 100 illustrating the position of the sensors 114a-f around the first target wheel 116. FIG. 1G is a perspective view of the mechanical environment 100 illustrating an example parallel target 120 and example slanted targets 122, 124. The sensor arrays 106, 108, 110, 112 are not shown in FIGS. 1D-F for purposes of simplifying the illustration. FIG. 1H is a top view of an alternative embodiment of the first target wheel 116. The target wheel 116 has sensor targets 130a-h mounted on the target wheel 116, instead of or in addition to the target wheel 116 being a toothed target wheel.

Figure 2:
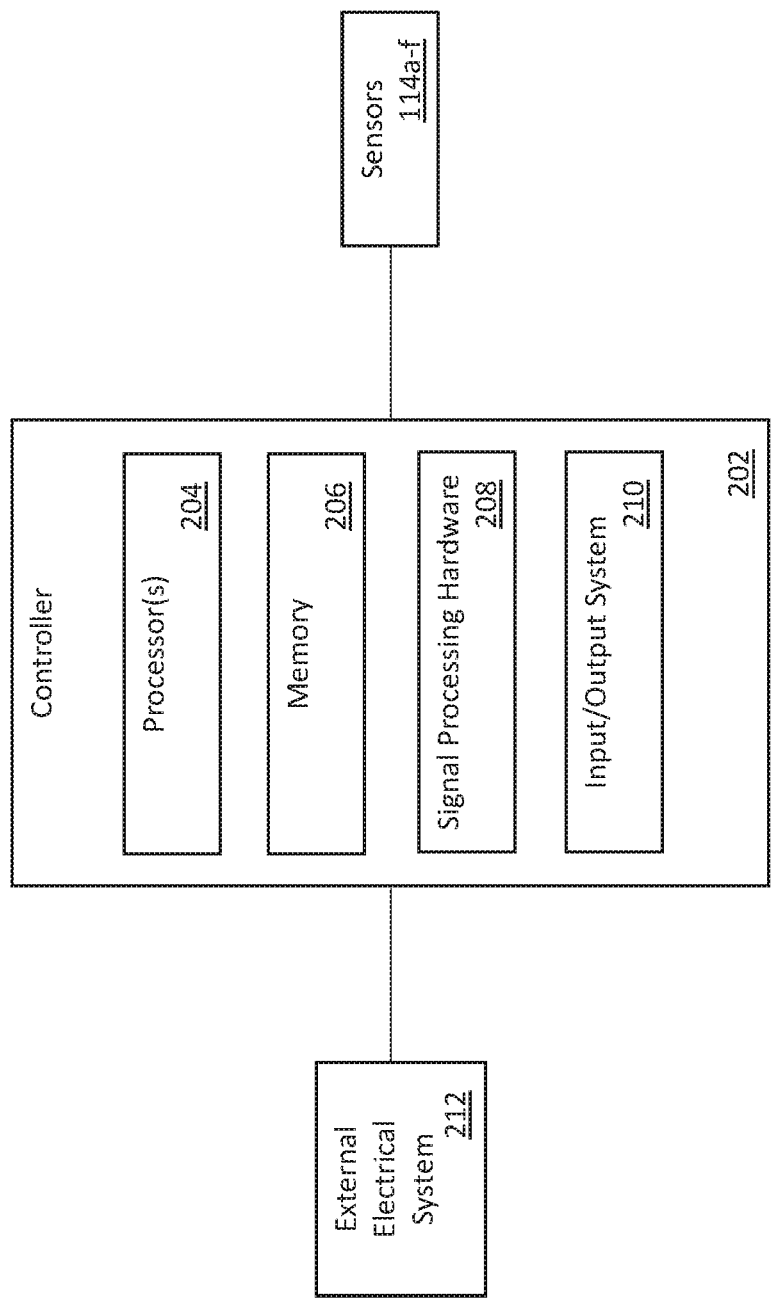
FIG. 2 is block diagram of a controller configured to receive sensor signals from the sensors.

FIG. 2 is block diagram of a controller 202 configured to receive sensor signals, e.g., as electrical signals, from the sensors 114a-f. The controller 202 is configured, e.g., by virtue of appropriate signal processing that is partially based upon the equations disclosed herein and as further known to those having skill in the art of electronic control systems, in order to determine, based on the sensor signals, an axial displacement measure of the shaft 102 in the longitudinal direction 126 and a radial displacement measurement of the shaft 102.

In the illustrated embodiments, the controller 202 includes one or more processors 204 and memory 206 storing executable instructions for the processors 204. The controller 202 includes an input/output system 210 configured for electronically receiving the sensor signals from the sensors 114a-f. The electronic communication may be accomplished using wired or wireless communication. In some embodiments, the input/output system 210 is configured, by virtue of including appropriate communications circuits, for transmitting information to an external power and/or signal interface 212, referred to hereinafter as signal interface 212, for example which is the power and/or control system for a motor or engine driving the shaft 102. For example, the controller 202 can be configured for transmitting safety critical feedback to an external electrical system such as control feedback or structural health indicators.

The controller 202 includes signal processing hardware 208 for receiving the sensor signals from the sensors 114a-f and, as disclosed herein, determining appropriate rotational parameters based on the sensor signals. The signal processing hardware 208 can include any appropriate circuits for capturing waveforms and waveform parameters from sensor signals. In some embodiments, the signal processing hardware 208 includes circuits for detecting a rising or falling edge or a zero-crossing at any time, including times that are not quantized by a digital clock. In some embodiments, the signal processing hardware 208 includes sample-and-hold devices that are triggered by rising or falling edges or zero-crossings, which are implemented by trigger circuits and counter circuits.

In some embodiments, the controller 202 is configured to determine the axial displacement measurement of the shaft 102 based on a relative timing difference between detecting slanted targets 122, 124 and detecting parallel targets 120, which is described further below with reference to FIGS. 5-6. In some embodiments, the controller 202 is configured to determine a twist measurement using a mean timing difference between detecting the sensor targets across two target wheels.

In some embodiments, the controller 202 is programmed to determine one or more or all of control feedback parameters or structural health indicators to include, but not limited to: axial strain, axial displacement, parallel misalignment, angular misalignment, run-out, and twist.

In some embodiments, the controller 202 is configured to transmit safety critical feedback to a signal interface 212 based on the one or more structural health indicators or real-time control parameters. For example, the controller 202 in some embodiments is programmed to transmit an alert message to the signal interface 212 if one of the structural health indicators falls outside of a predetermined range for the structural health indicator. The signal interface 212 can respond to the safety critical information with any appropriate actions. For example, suppose that the signal interface 212 is an electronic control unit for a motor rotating the shaft 102. In some embodiments, the electronic control unit decreases power to the motor or engine in response to the safety critical information.

Typically, the controller 202 measures timing information using the sensor signals by determining timing between detection of targets on the target wheels 116, 118. In some embodiments, the controller 202 receives sensor signals from the first and second sensor arrays 106, 108 at opposite ends of a rotational coupling and determines, using first sensor signals from the first sensor array 106 and second sensor signals from the second sensor array 108, various displacements of the first and second target wheels 116, 118.

The controller 202 can be implemented in software in combination with hardware and/or firmware. For example, the controller 202 can be implemented in software executed by a processor. In some embodiments, the controller 202 is implemented using a computer readable medium having stored thereon computer executable instructions that when executed by the processor of a computer control the computer to perform steps. Examples of computer readable media suitable for implementing the controller 202 include non-transitory devices, such as disk memory devices, chip memory devices, programmable logic devices, and application specific integrated circuits. In addition, a computer readable medium for the controller 202 may be located on a single device or computing platform or may be distributed across multiple devices or computing platforms. Design, configuration, and operation of controllers are known to those skilled in the art, to include the necessary software and firmware programming to operate the controller. Those having skill in the art know that the primary purpose of controller is to (a) condition the sensor inputs and convert these inputs into target timing values, (b) condition the power input, (c) implement the math and signal processing provided in the patent and (d) communicate with the signal interface. In this case, controller 202 is such that one skilled in the art is able to create it based upon existing knowledge.

Figure 3:
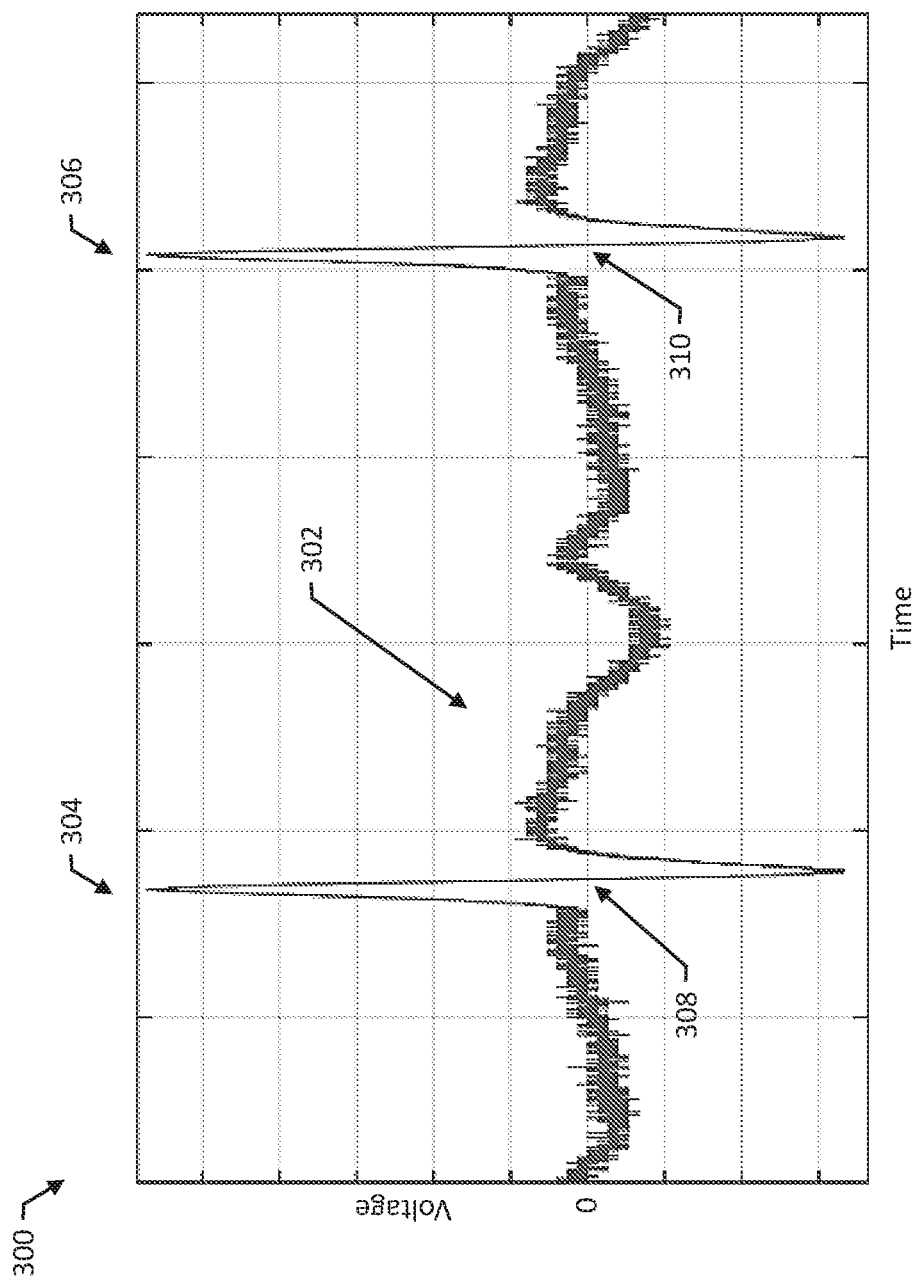
FIG. 3 shows a graph of an example waveform from one of the sensors.

FIG. 3 shows a graph 300 of an example waveform 302 from one of the sensors 114a-f. The graph 300 shows time on the horizontal axis and the voltage output from the sensor on the vertical axis. In the example illustrated in FIG. 3, the controller detects the passage of two targets indicated by two voltage pulses 304, 306 (containing "negative-sloped" zero crossings 308, 310) of the waveform 302. The controller 202 of FIG. 2 is configured to determine the time between the peaks, zero-crossings, or other thresholds of the voltage pulses 304, 306 using methods known to those skilled in the art such as an instrumentation amplifier coupled with a comparator. The controller 202 of FIG. 2 uses timing measurements between target teeth to calculate twist, axial and radial motion of the target wheels 116, 118 as will be explained herein.

Figure 4:
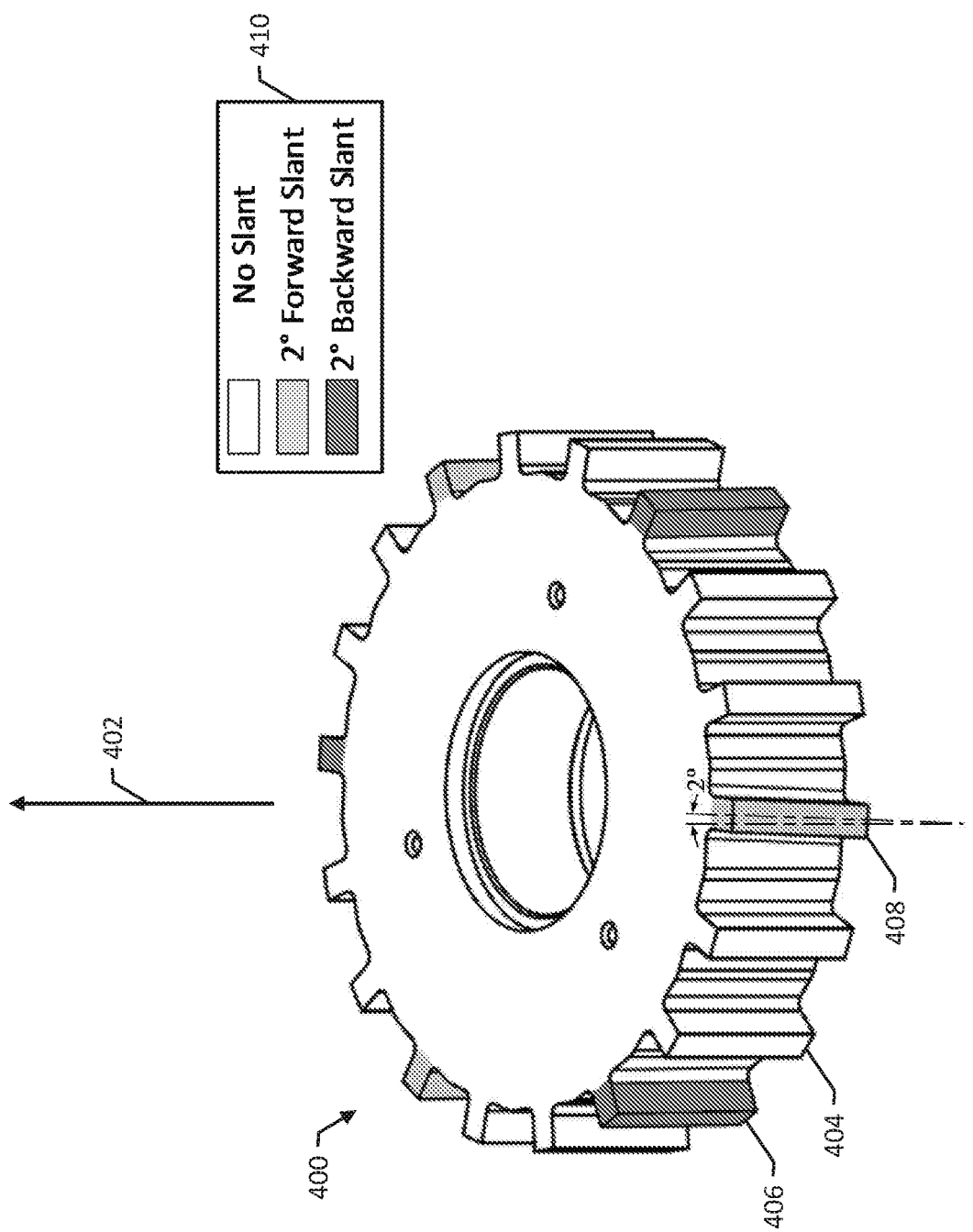
FIG. 4 shows an example target wheel with slanted targets.

FIG. 4 shows an example target wheel 400 with slanted targets. The target wheel 400 can rotate around a rotational axis extending in a longitudinal direction 402. The target wheel 400 includes both parallel targets 404 which are substantially parallel with the longitudinal direction 402, and slanted targets 406, 408 that are slanted with respect to the longitudinal direction 402. The slanted targets 406, 408 and the parallel targets 404 are circumferentially arranged in an alternating fashion, similar to those illustrated in the target wheel 116 of FIGS. 1A-F.

The slanted targets 406, 408 are slanted in opposite orientations in an alternating fashion around the target wheel 404 as specified in the legend 410. In particular, the target wheel 400 includes some targets with a forward slant, e.g., slanted target 408, and some targets with a backwards slant, e.g., slanted target 406. In the example shown in FIG. 3, the slanted targets 406, 408 each have a 2° slant; however, in general, the slanted targets 406, 408 can be slanted with any appropriate angle from the longitudinal direction 402.

FIG. 5 shows an example axial target pattern for a target wheel having slanted targets, e.g., the target wheel 116 of FIGS. 1A-F. FIG. 6 shows a different example axial target pattern for a target wheel having slanted targets.

Axial motion can be measured using the relative timing of the slanted targets. If the slanting of the targets is done appropriately, the mean timing difference of the targets remains unchanged over a complete rotation, which gives twist, and the relative timing difference of the targets allows axial motion to be calculated, as described hereinbelow. The sensors are nominally located over the center of the targets and as the targets rotate past, the sensors detect the delta time, or Ts, of each target with the next. If opposing slants are used, then the timing difference can be "zero mean" and can be filtered out using computationally efficient moving averaging filters.

Figure 5B:
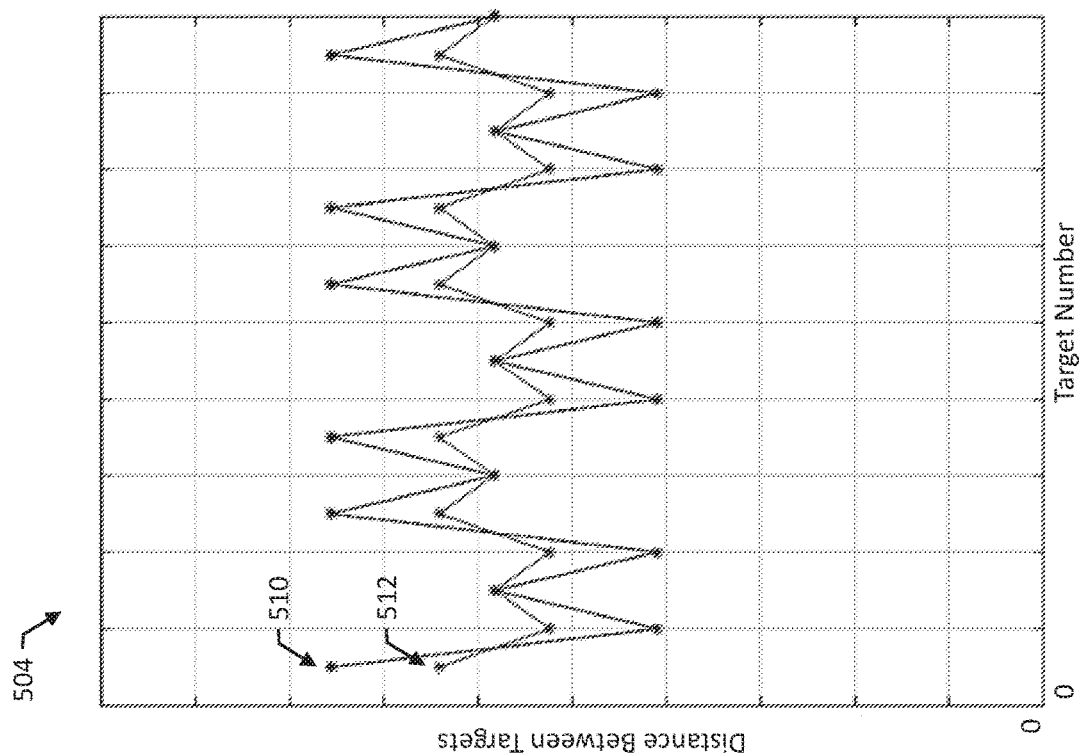
FIGS. 5A and 5B show an example axial target pattern for a target wheel having slanted targets.
Figure 5A:
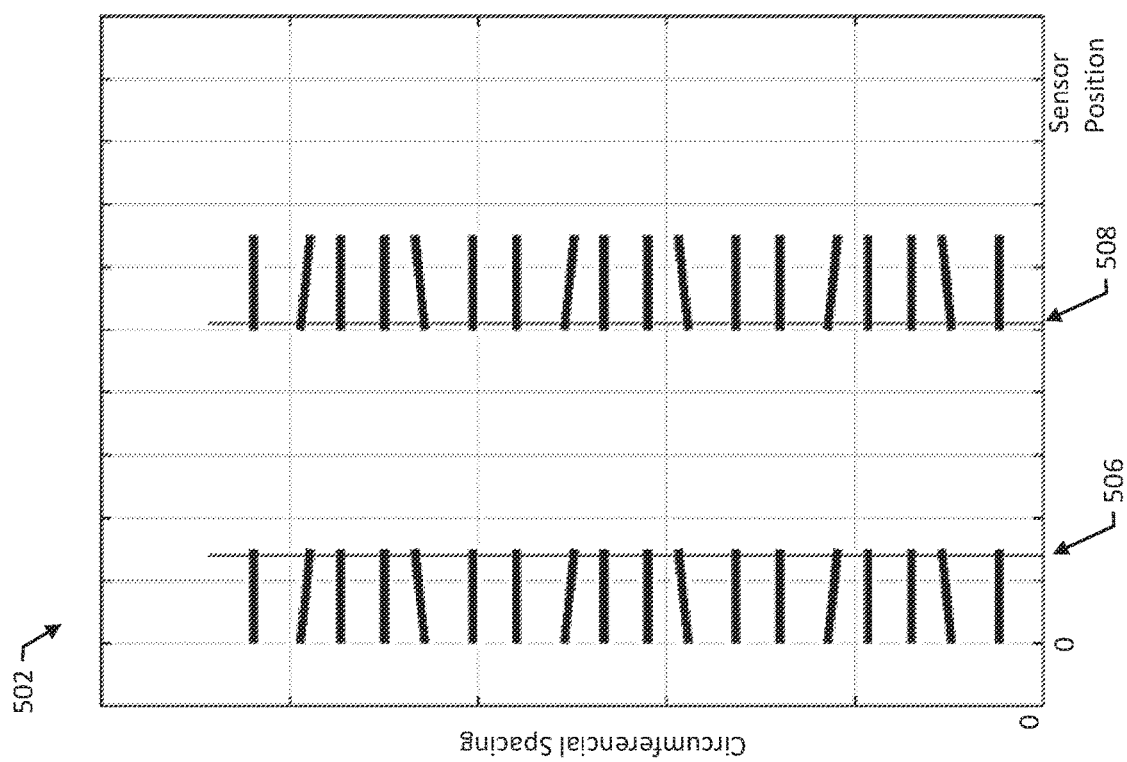

In the example of FIGS. 5A and 5B, there are 18 targets per target wheel. The chart 502 of FIG. 5A illustrates the orientation of the targets in the direction of the shaft, and the chart 504 of FIG. 5B illustrates axial target spacing as detected by sensors. A first vertical line 506 illustrates a first axial position of the sensors, and a corresponding plot 510 illustrates the distance between targets as measured by the sensors at the first axial position. A second vertical line 508 illustrates a second axial position of the sensor, and a corresponding plot 512 illustrates the distance between targets as measured by the sensors at the second axial position. Both plots 510 and 512 have the same mean distance between targets. The difference between the two plots 510 and 512 can be used to calculate the distance between the first and second axial positions.

Figure 6B:
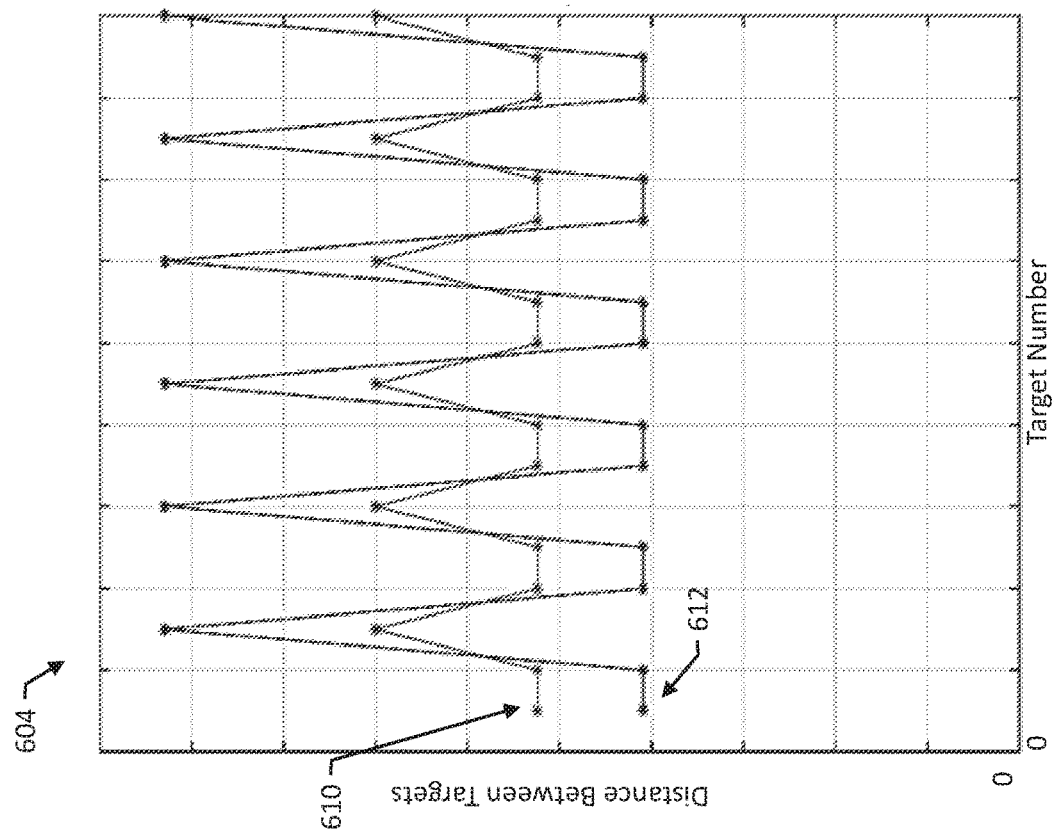
FIGS. 6A and 6B show a different example axial target pattern for a target wheel having slanted targets.
Figure 6A:
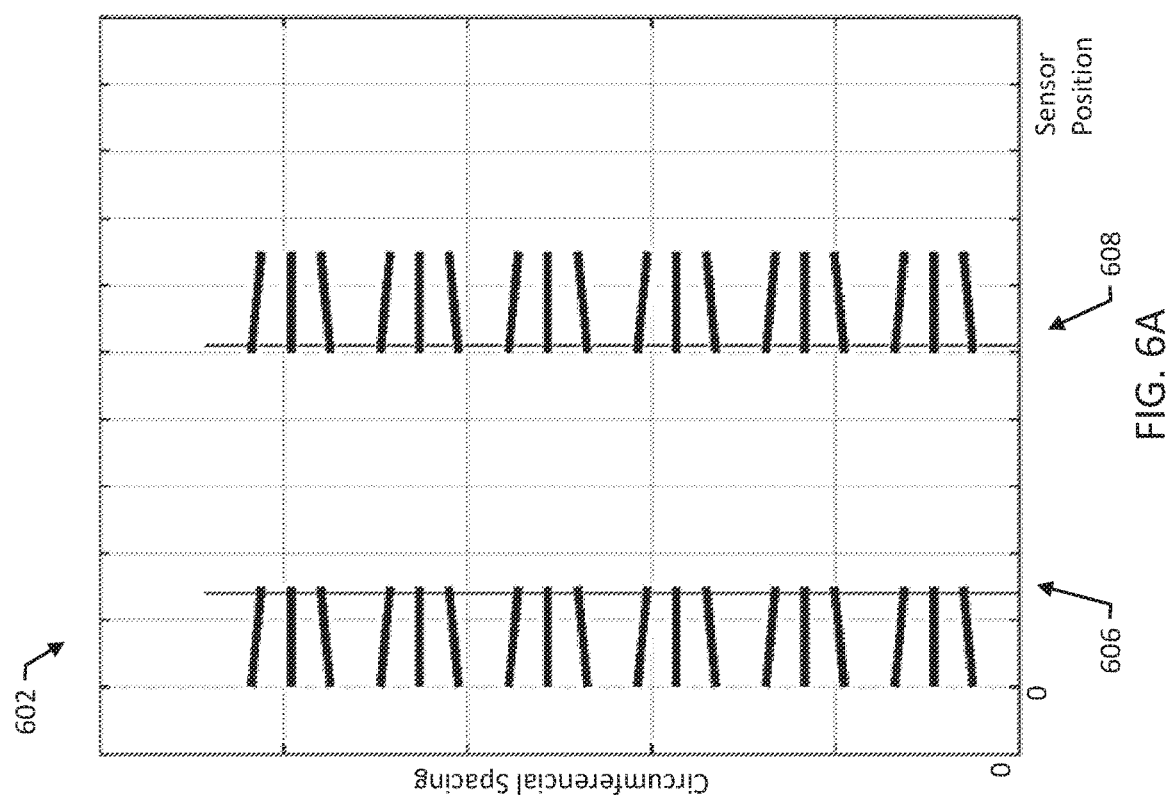

FIGS. 6A and 6B illustrate a different example axial target pattern. The chart 602 of FIG. 6A illustrates the orientation of the targets in the direction of the shaft, and the chart 604 of FIG. 6B illustrates axial target spacing as detected by sensors. A first vertical line 606 illustrates a first axial position of the sensors, and a corresponding plot 610 illustrates the distance between targets as measured by the sensors at the first axial position. A second vertical line 608 illustrates a second axial position of the sensor, and a corresponding plot 612 illustrates the distance between targets as measured by the sensors at the second axial position.

To calculate the timing differences due to axial motion, let $Ts_i^k$ be the period between the current target and the previous target zero crossings for the ith sensor and the kth timestep. These timing measurements can be approximated by the following equation:

$$Ts_i^k = f_{clock}/Nf_{rot} \tag{1}$$

where $f_{clock}$ is the frequency of the processor clock in Hertz, N is the number of targets, and $f_{rot}$ is the rotational frequency of the spinning target wheel in Hertz. Regardless of the slants in the targets, if the $Ts_i^k$ is moving averaged filtered then the values of timing for the shaft is unaffected:

$$\overline{Ts}_i^k = \frac{1}{N}\left(Ts_i^k + Ts_i^{k-1} + \ldots + Ts_i^{k-(N-2)} + Ts_i^{k-(N-1)}\right) \tag{2}$$

Where $\overline{Ts}_i^k$ is the moving average filtered timer delta of $Ts_i^k$. As will be shown, this average value is not affected by the axial motion. Axial motion does have a slight effect on the timer deltas. In terms of linear distance (L) between targets axial motion has the following effect:

$$L = \frac{2\pi R}{N} + \tan(\theta_{slant}) * \Delta z_i \tag{3}$$

where R is the radius of the targets, N is the number of targets, $\Delta z_i$ is the axial motion at the "ith" sensor, and $\theta_{slant}$ slant is the angle of the slanted targets. Using this relationship, the timer deltas of each "ith" sensor can be approximated by the equation below at the kth sample.

$$Ts_i^k = (f_{clock}/f_{rot})\left(\frac{1}{N} \pm \frac{\Delta z_i}{2\pi R}\tan(\theta_{slant})\right) \tag{4}$$

Where the ± is used to indicate whether the delta is increased by the slant angle or decreased by the slant angle. Noted by the physics of the target wheel, every increase in timing is accompanied by an equal decrease in timing.

Consider the following example, where there are 18 targets (N=18) where there are slant angles on the k-2, k-5, k-8, k-11, k-14, and k-17 targets. These slant angles alternate (similar to what is in FIG. 5), which gives the following set of equations:

$$Ts_i^k = Ts_i^{k-3} = Ts_i^{k-6} = Ts_i^{k-9} = Ts_i^{k-12} = Ts_i^{k-15} = \frac{f_{clock}}{Nf_{rot}} \tag{5}$$

$$Ts_i^{k-1} = Ts_i^{k-5} = \tag{6}$$
$$Ts_i^{k-7} = Ts_i^{k-11} = Ts_i^{k-13} = Ts_i^{k-17} = \frac{f_{clock}}{f_{rot}}\left(\frac{1}{N} - \frac{\Delta z_i}{2\pi R}\tan(\theta_{slant})\right)$$

$$Ts_i^{k-2} = Ts_i^{k-4} = \tag{7}$$
$$Ts_i^{k-8} = Ts_i^{k-10} = Ts_i^{k-14} = Ts_i^{k-16} = \frac{f_{clock}}{f_{rot}}\left(\frac{1}{N} + \frac{\Delta z_i}{2\pi R}\tan(\theta_{slant})\right)$$

If the moving average filter timer delta ($\overline{Ts}_i^k$) is calculated by the aforementioned equation in this example, the following equation results:

$$\overline{Ts}_i^k = \frac{1}{18}(6*Ts_i^k + 6*Ts_i^{k-1} + 6*Ts_i^{k-2}) \tag{8}$$

$$\overline{Ts}_i^k = \frac{1}{18}\left(6*\frac{f_{clock}}{Nf_{rot}} + 6*\frac{f_{clock}}{f_{rot}}\left(\frac{1}{N} - \frac{\Delta z_i}{2\pi R}\tan(\theta_{slant})\right) + \tag{9}\right.$$
$$\left. 6*\frac{f_{clock}}{f_{rot}}\left(\frac{1}{N} + \frac{\Delta z_i}{2\pi R}\tan(\theta_{slant})\right)\right)$$

$$\overline{Ts}_i^k = \frac{f_{clock}}{Nf_{rot}} \tag{10}$$

The above equation indicates that the Moving Average filtered timer delta is invariant to the slants in the target. To get axial motion from the timer deltas, the following set of filtering is defined where the timer deltas are divided into three separate moving average filters:

$$\overline{Ts1}_i^k = \frac{3}{N}\left(\sum_{n=0}^{n=5}(-1)^n Ts_i^{k-3*n}\right) \tag{11}$$

$$\overline{Ts2}_i^k = \frac{3}{N}\left(\sum_{n=0}^{n=5}(-1)^n Ts_i^{k-1-3*n}\right) \tag{12}$$

$$\overline{Ts3}_i^k = \frac{3}{N}\left(\sum_{n=0}^{n=5}(-1)^n Ts_i^{k-2-3*n}\right) \tag{13}$$

In the preceding example, the following timer delta moving averages result in the following:

$$\overline{Ts1}_i^k = \frac{3}{N}\left(\sum_{n=0}^{n=5}(-1)^n Ts_i^{k-3*n}\right) = 0 \tag{14}$$

$$\overline{Ts2}_i^k = \frac{3}{N}\left(\sum_{n=0}^{n=5}(-1)^n Ts_i^{k-1-3*n}\right) = \frac{f_{clock}}{f_{rot}}\left(-\frac{\Delta z_i}{2\pi R}\tan(\theta_{slant})\right) \tag{15}$$

$$\overline{Ts3}_i^k = \frac{3}{N}\left(\sum_{n=0}^{n=5}(-1)^n Ts_i^{k-2-3*n}\right) = \frac{f_{clock}}{f_{rot}}\left(+\frac{\Delta z_i}{2\pi R}\tan(\theta_{slant})\right) \tag{16}$$

Provided that the value of $\Delta z_i$ always remains positive or negative, the axial timer deltas can be combined deterministically to the following:

$$\widehat{Ts}_i^k = \frac{1}{3}\left(|\overline{Ts1}_i^k| + |\overline{Ts2}_i^k| + |\overline{Ts3}_i^k|\right) \tag{17}$$

$$\widehat{Ts}_i^k = \frac{2}{3}\frac{f_{clock}}{f_{rot}}\left(\frac{\Delta z_i}{2\pi R}\tan(\theta_{slant})\right) \tag{18}$$

These axial timer deltas can be nominally converted to axial displacement at each sensor via the following equation:

$$\Delta z_i = \widehat{Ts}_i^k \frac{3}{2}\frac{f_{rot}}{f_{clock}}\frac{2\pi R}{\tan(\theta_{slant})} \tag{19}$$

In some embodiments, to calculate an accurate axial motion measurement ($\Delta z_i$), the axial timer deltas ($\widehat{Ts}_i^k$) may be calibrated over various operating conditions.

Target timing measurements provide for measurement of the following degrees-of-freedom in a shaft segment or coupling: $\Delta x$ and $\Delta y$ (radial displacements), $\theta_X$ and $\theta_Y$ (angular displacements), $\Delta z$ (axial displacement) and $\theta_Z$ or $\theta_{twist}$ (twist). U.S. Pat. No. 7,093,504 describes methods and systems for using target timing measurements and is co-owned with the present application as of the date of filing of the present application. U.S. Pat. No. 7,093,504 is hereby incorporated by reference in its entirety.

In particular, U.S. Pat. No. 7,093,504 describes the orientation of each sensor as an angle from x axis in the x-y plane in FIG. 4. U.S. Pat. No. 7,093,504 describes using target timing measurements to determine twist in FIGS. 1, 5A, 5B, and 6 and in the specification in col. 15, line 20-col. 17, line 64. For purposes of illustration, portions of U.S. Pat. No. 7,093,504 are reproduced below in FIGS. 8D-8H and the corresponding text. U.S. Pat. No. 7,093,504 FIGS. 1, 4, 5A, 5B and 6 are FIGS. 8D, 8E, 8F, 8G, and 8H, respectively.

For example, to illustrate the use of target timing measurements, consider the example system illustrated in FIGS. 8D-8H. FIGS. 8D-8H show the use of target timing measurements to determine a twist angle and radial motion.

Figure 8B:
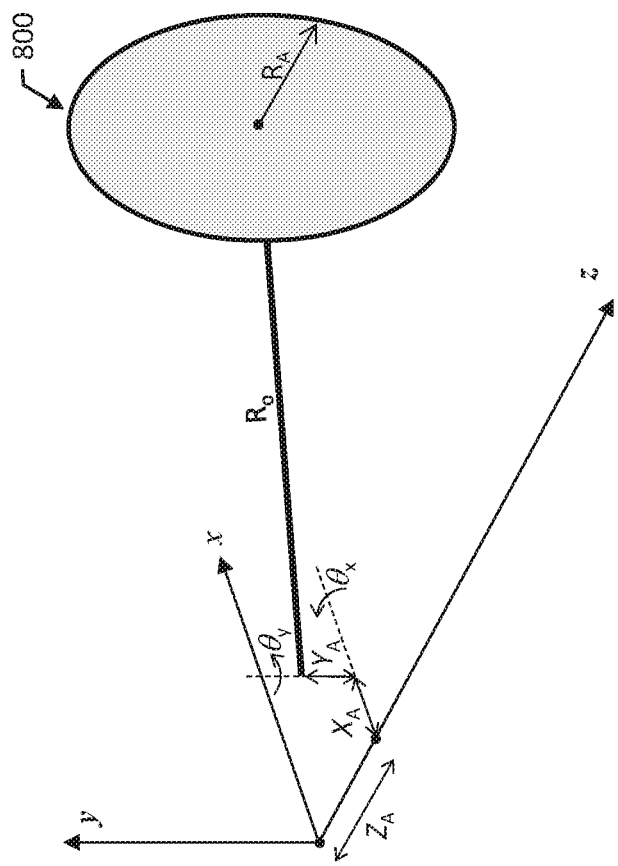
FIGS. 8A and 8B illustrate variables with reference to an example target plane.
Figure 8A:
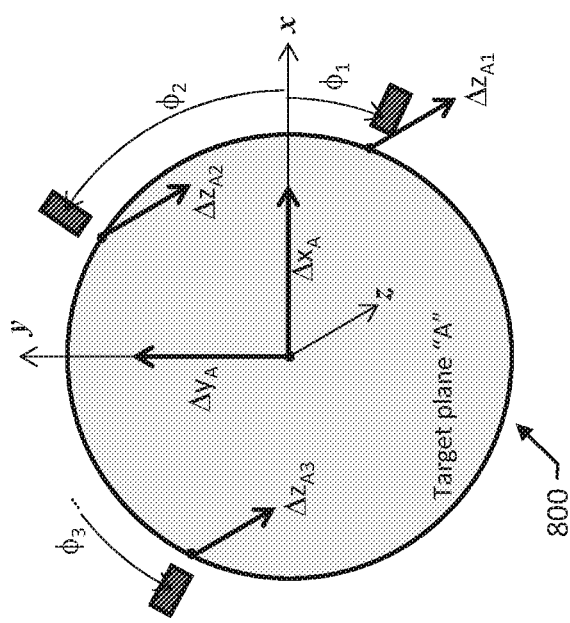
Figure 8C:
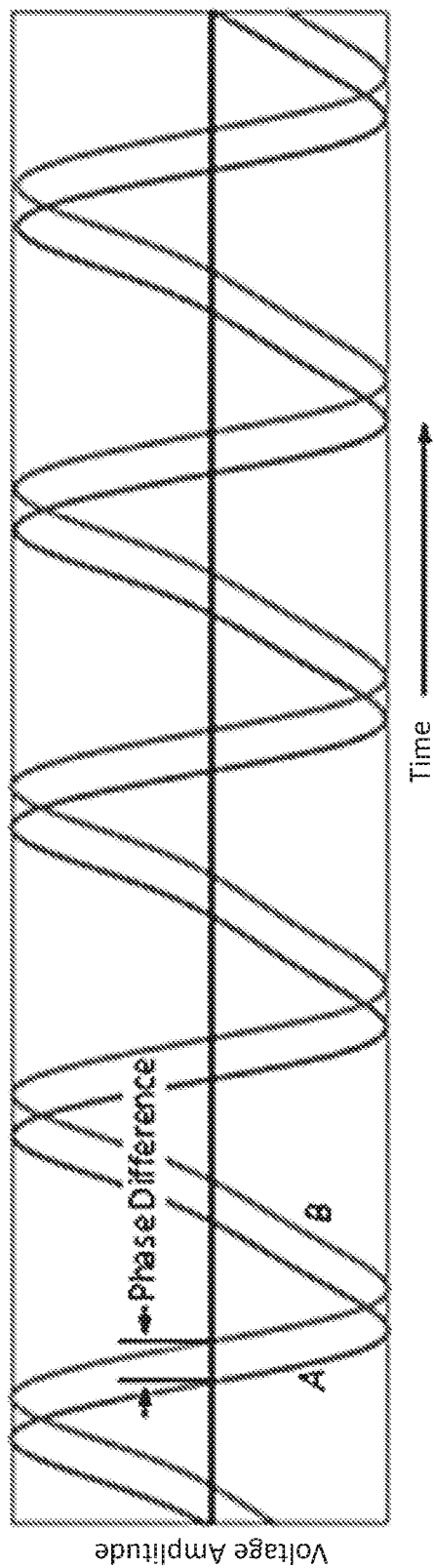
FIG. 8C shows example sensor waveforms illustrating a phase difference between two sensors.
Figure 8D:
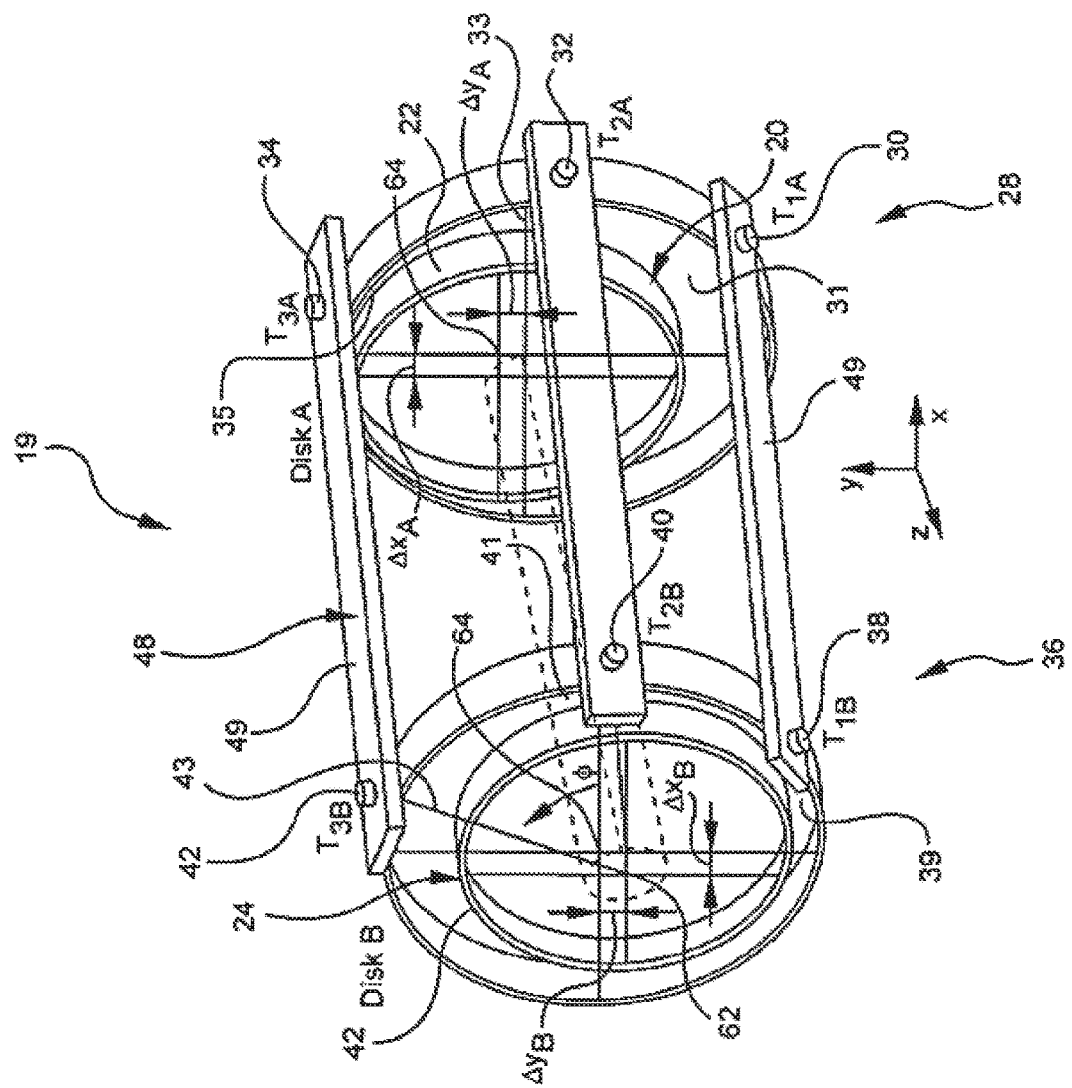
Figure 8E:
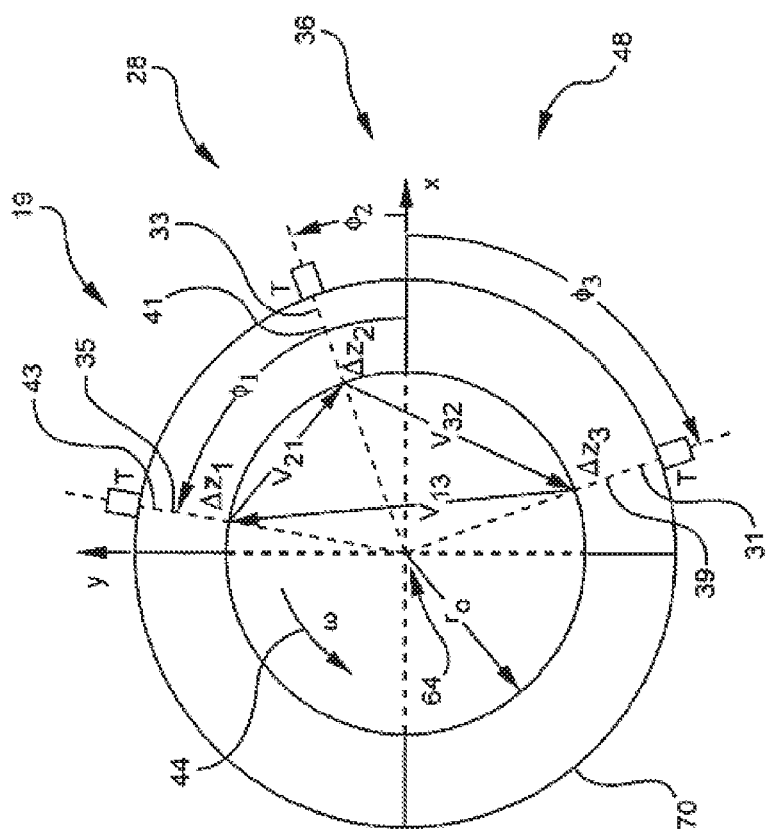

FIG. 8D shows a twist angle measurement system 19. The system 19 is comprised of a first rotating disk 20 (Disk A) rotating about a first rotating disk center z-axis 60 with the first disk 20 oriented in an x-y plane, the first rotating disk 20 having a target pattern 22, a second rotating disk 24 (Disk B) rotating about a second rotating disk center z-axis 62 with the second disk 24 oriented in an x-y plane, the second rotating disk 24 having a target pattern 26, a sensor cradle 48 centered around a sensor cradle reference z-axis 64, the sensor cradle 48 encompassing the first rotating disk 20 and the second rotating disk 24 with a first disk first sensor 30 ($T_{1A}$), a first disk second sensor 32 ($T_{2A}$), a first disk third sensor 34 ($T_{3A}$), the first disk first sensor, the first disk second sensor, and the first disk third sensor fixed around and encompassing the first rotating disk 20 and positioned for simultaneously sensing the first rotating disk target pattern 22 and pointed towards center z-axis 60, and the sensor cradle 48 including a second disk first sensor 38 ($T_{1B}$), a second disk second sensor 40 ($T_{2B}$), a second disk third sensor 42 ($T_{3B}$), the second disk first sensor, the second disk second sensor, and the second disk third sensor fixed around and encompassing the second rotating disk 24 and positioned for simultaneously sensing the second rotating disk target pattern 26 and pointed towards center z-axis 62, the first disk first sensor 30 ($T_{1A}$) positioned adjacent the second disk first sensor 38 ($T_{3B}$), the first disk second sensor 32 ($T_{2A}$) positioned adjacent the second disk second sensor 40 ($T_{2B}$), and the first disk third sensor 34 ($T_{3A}$) positioned adjacent the second disk third sensor 42 ($T_{3B}$) with the sensors positioned to sense a $\Delta x$ offset and a $\Delta y$ offset of the first rotating disk center z-axis 60 from the sensor cradle reference z-axis 64 and a $\theta x$ offset and a $\theta y$ offset of first rotating disk relative to sensor cradle and a $\Delta x$ offset and a $\Delta y$ offset of the second rotating disk center z-axis 62 from the sensor cradle reference z-axis 64 and a $\theta x$ offset and a $\theta y$ offset of second rotating disk relative to sensor cradle to provide for determination of an actual twist angle $\theta_{twist}$ between the first rotating disk 20 and the second rotating disk 24 from a sensed apparent twist and the offsets.

The sensor housing cradle 48, is shown in FIG. 8D as three separate bars or arms 49 with sensors T encompassing the rotating disks 20 and 24. The arms 49 may be connected together at either end, or they may be constructed as a single mechanical piece that contains all the sensors. An absolute x-y-z coordinate system housing reference frame is defined by the sensor housing 48, with measurements made relative to the housing reference frame 48. Note that this absolute coordinate system can move if the rigid sensor housing 48 experiences any motion relative to an inertial reference frame.

While the target disks 20, 24 are spinning, both target disks can experience motions in each of their six rigid body degrees of freedom. The time-varying target disk motions may be relative to the sensor housing 48 and/or relative to each other. FIG. 8D indicates that the axis of rotation of each disk may not be coincident with or parallel to the axis 64 of the sensor housing 48. The center of Disk A is shown to be offset by an amount $\{\Delta x_A, \Delta y_A\}$, and the center of Disk B is shown to be offset by a possibly different amount $\{\Delta x_B, \Delta y_B\}$. The disk displacements $\Delta x_A(t), \Delta y_A(t)\}$ and $\{\Delta x_B(t), \Delta y_B(t)\}$ can be time-varying.

Referring to U.S. Pat. No. 7,093,504, col. 15, lines 20-36, with the reference to equation numbers and figure numbers being updated for consistency with this disclosure, the timing measurements can be used to determine a twist measurement with twist measured as the angular displacement of Disk B relative to Disk A around the z-axis. Preferably the method for measuring twist includes measuring the timing difference between the sensible lines rising (or falling) edges of the pulses from corresponding sensors on Disk A and Disk B. For three sensor arms 49 in FIG. 8D, there are three possible measurements:

$$\Delta t(\uparrow_k^{1B}, \uparrow_k^{1A}) = \Delta t(\downarrow_k^{1B}, \downarrow_k^{1A})$$

$$\Delta t(\uparrow_k^{2B}, \uparrow_k^{2A}) = \Delta t(\downarrow_k^{2B}, \downarrow_k^{2A})$$

$$\Delta t(\uparrow_k^{3B}, \uparrow_k^{3A}) = \Delta t(\downarrow_k^{3B}, \downarrow_k^{3A}) \tag{20}$$

where $\Delta t(\uparrow_k^{1B}, \uparrow_k^{1A})$ represents timing difference between rising target edges on corresponding targets on Disk B and Disk A from sensor $T_{1B}$ and $T_{1A}$. Furthermore $\Delta t(\uparrow_k^{1A}, \uparrow_{k+1}^{1A})$ represents the time between consecutive rising target edges from sensor $T_{1A}$, and $\Delta t(\downarrow_k^{1A}, \downarrow_{k+1}^{1A})$ represents the time between consecutive falling edges from sensor $T_{1A}$ on target Disk A. Referring to U.S. Pat. No. 7,093,504, col. 15, lines 37-67, with the reference to equation numbers and figure numbers being updated for consistency with this disclosure, we may use either rising or falling edges (both should be equivalent), however, only three of the timing measurements are independent (i.e. one from each pair above).

In the very special case where the offsets of Disk A and Disk B are all zero, i.e. $\Delta x_A = \Delta x_B = 0$, and $\Delta y_A = \Delta y_B 0$, then any one of the measurements in equation 20 along with the instantaneous rotational speed of the shaft will provide a simple and redundant measurement of twist.

$$\tilde{\theta}_1 = \omega_{shaft} \Delta t(\uparrow_k^{1B}, \uparrow_k^{1A})$$

$$\tilde{\theta}_2 = \omega_{shaft} \Delta t(\uparrow_k^{2B}, \uparrow_k^{2A})$$

$$\tilde{\theta}_3 = \omega_{shaft} \Delta t(\uparrow_k^{3B}, \uparrow_k^{3A}) \qquad (21)$$

The timing measurements will be distorted by offset displacements of the target disks. In this sense, the quantities on the left-hand side of the above equation, i.e. $\tilde{\theta}_1$, $\tilde{\theta}_2$, and $\tilde{\theta}_3$ are apparent twist angles. FIGS. 8F and 8G show an analysis of timing effects associated with x-y motion of the target disk. To clarify this point, we first consider only the reference disk as shown in FIG. 8F.

FIG. 8F shows Disk A perfectly centered on the x-y axis of the sensor housing 48. For simplicity, a single notch is drawn on the perimeter of the disk. First we rotate this notch up to the sensor T located at $\phi$ radians from the x-axis, as indicated by the shaded wedge in FIG. 8F. Now assume Disk A is fixedly offset from the axis 64 of the sensor housing 48, as shown in FIG. 8G. For the offset example of FIG. 8G, it is clear that rotating the notch through the same $\phi$ radians will cause the notch to move beyond the sensor.

Referring to U.S. Pat. No. 7,093,504, col. 16, lines 1-34, with the reference to equation numbers and figure numbers being updated for consistency with this disclosure and referring to close-up view provided in FIG. 8H, the critical parameter is the relative angle $\alpha = \phi - \psi$. This relative angle can be thought of as the apparent angular distortion induced by offsets in the center of rotation, and measured at the sensor located at $\phi$, thus we could write $\alpha = \alpha(\phi, \Delta x, \Delta y)$. This distortion clearly has a significant impact on the measurement of twist angle and the associated timing pulses from the tachometer sensors. Fortunately, the angular distortion $\alpha$ can be related to the offset parameters.

$$r \sin \psi = R \sin \phi - \Delta y \atop r \cos \psi = R \cos \psi - \Delta x \Rightarrow \tan \psi = \left( \frac{\sin \phi - \left(\frac{\Delta y}{R}\right)}{\cos \phi - \left(\frac{\Delta x}{R}\right)} \right) \qquad (22)$$

From the geometric definition of $\alpha$ we see that $$\alpha(\phi, \Delta x, \Delta y) = \phi - \tan^{-1}\left( \frac{\sin \phi - \left(\frac{\Delta y}{R}\right)}{\cos \phi - \left(\frac{\Delta x}{R}\right)} \right) \qquad (23)$$

where again $\phi$ is the known position of the sensor T, and R is the known radius of the sensor housing. Referring to U.S. Pat. No. 7,093,504, col. 16, lines 36-42 and generally to col. 16, line 43-col. 7, line 35, for small displacements, this simplifies to the following:

$$\left(\frac{\Delta y}{R}\right) \ll 1 \text{ and } \left(\frac{\Delta x}{R}\right) \ll 1 \Rightarrow \qquad (24)$$

$$\alpha(\phi, \Delta x, \Delta y) \approx \left(\frac{\Delta y}{R}\right) \cos \phi - \left(\frac{\Delta x}{R}\right) \sin \phi$$

Referring generally to U.S. Pat. No. 7,093,504, col. 17, lines 36-64, and to equations (25) and (26) below, the following equations can be solved to provide a measure of the twist angle $\theta_{twist}$ and to provide secondary measures of shaft alignment, i.e., $\{\Delta x_A, \Delta y_A, \Delta x_B, \Delta y_B\}$.

$$\begin{bmatrix} -(\sin \phi_1 - \sin \phi_2) & (\cos \phi_1 - \cos \phi_2) \\ -(\sin \phi_2 - \sin \phi_3) & (\cos \phi_2 - \cos \phi_3) \end{bmatrix} \begin{bmatrix} \Delta x_A \\ \Delta y_A \end{bmatrix} = \qquad (25)$$

$$\begin{bmatrix} R\omega_{shaft} \Delta t(\tau_k^{1A}, \tau_k^{2A}) \\ R\omega_{shaft} \Delta t(\tau_k^{2A}, \tau_k^{3A}) \end{bmatrix}$$

$$\begin{bmatrix} R \sin \phi_1 & -\cos \phi_1 \\ R \sin \phi_2 & -\cos \phi_2 \\ R \sin \phi_3 & -\cos \phi_3 \end{bmatrix} \qquad (26)$$

$$\begin{bmatrix} \theta_{twist} \\ \Delta x_B \\ \Delta y_B \end{bmatrix} = \begin{bmatrix} R\omega_{shaft} \Delta t(\tau_k^{1B}, \tau_k^{1A}) + \Delta x_A \sin \phi_1 - \Delta y_A \cos \phi_1 \\ R\omega_{shaft} \Delta t(\tau_k^{2B}, \tau_k^{2A}) + \Delta x_A \sin \phi_2 - \Delta y_A \cos \phi_2 \\ R\omega_{shaft} \Delta t(\tau_k^{3B}, \tau_k^{3A}) + \Delta x_A \sin \phi_3 - \Delta y_A \cos \phi_3 \end{bmatrix}$$

These equations are non-singular and solvable since we generally can choose the placement of sensors. A least squares solution can also be used.

Figure 7:
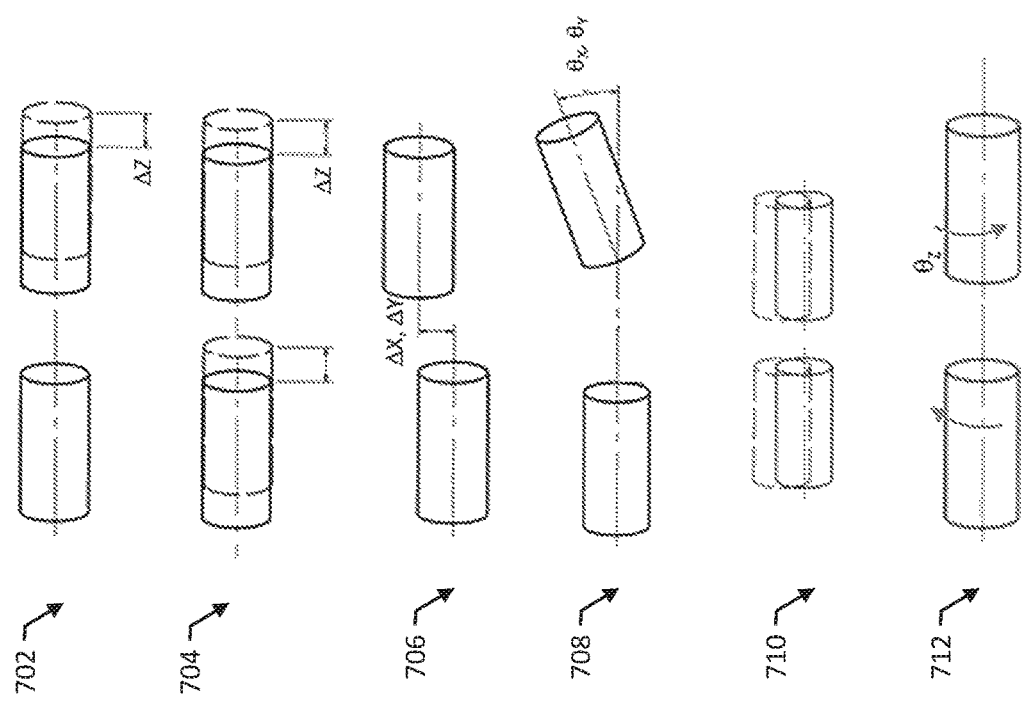
FIG. 7 illustrates various types of shaft or coupling alignments that can be determined using the systems and methods described in this specification.

These measurements, in turn, allow for measurement of the shaft alignment parameters shown in FIG. 7.

Referring back to FIGS. 8A and 8B, for each target plane, target timing measurements within that plane can be used to assess the deflection of the target plane centroid with respect to the sensor array. These deflections are defined in FIG. 8A. In particular, equation 15 of U.S. Pat. No. 7,093,504, which is equation 26 above, provides the computation of $\Delta x_A$ and $\Delta y_A$ based on timing measurements, and the above calculations provide the computation of $\Delta z_{Ai}$ based on timing measurements of slanted targets. While the computation of $\Delta x_A$, $\Delta y_A$, $\Delta x_B$, and $\Delta y_B$ in U.S. Pat. No. 7,093,504 is accurate, assumptions about the general motion of the shaft or coupling under measurement must be made. In essence, the measurement detailed in U.S. Pat. No. 7,093,504 cannot distinguish between translational and rotational motion of the target wheels. The addition of $\Delta z_{Ai}$ axial measurements allows the translation and rotational motion of the target wheels to be accurately distinguished as demonstrated in the forthcoming math.

The following computations illustrate a method for transforming timing-based measurements of target plane centroid deflections into relevant shaft or coupling alignment values as defined in FIG. 8B. Namely, these enable the following:

$$[X_A, Y_A, Z_A, \theta_x, \theta_y] = f([\Delta x_A, \Delta y_A, \Delta z_{A1}, \Delta z_{A2}, \Delta z_{A3}]) \qquad (27)$$

Similar calculations can be completed for the second target plane "B" and the results are summed with the results from target plane "A" to yield total coupling alignment values.

The following computations assume that $\theta_x$ and $\theta_y$ are small angles such that $\sin \theta \approx \theta$ and $\cos \theta \approx 1$. An analytical solution exists for the more precise solution, but is not included here for brevity. Simple trigonometry can demonstrate that $$\begin{bmatrix} \Delta z_{A1} \\ \Delta z_{A2} \\ \Delta z_{A3} \end{bmatrix} = \begin{bmatrix} R_A \sin(\varphi_1) & R_A \cos(\varphi_1) & 1 \\ R_A \sin(\varphi_2) & R_A \cos(\varphi_2) & 1 \\ R_A \sin(\varphi_3) & R_A \cos(\varphi_3) & 1 \end{bmatrix} \begin{bmatrix} \theta_x \\ \theta_y \\ Z_A \end{bmatrix} = T_A \begin{bmatrix} \theta_x \\ \theta_y \\ Z_A \end{bmatrix} \quad (28)$$

Coupling alignment values can then be calculated from $$\begin{bmatrix} \theta_x \\ \theta_y \\ Z_A \end{bmatrix} = T_A^{-1} \begin{bmatrix} \Delta z_{A1} \\ \Delta z_{A2} \\ \Delta z_{A3} \end{bmatrix} \quad (29)$$

Finally it can be shown that $$\begin{bmatrix} X_A \\ Y_A \end{bmatrix} = \begin{bmatrix} \Delta x_A \\ \Delta y_A \end{bmatrix} - R_0 \begin{bmatrix} \theta_y \\ \theta_x \end{bmatrix} \quad (30)$$

where $\theta_x$ and $\theta_y$ are computed as shown above. So these equations together provide the transformation of timing-based measurements of target plane centroid deflections into relevant shaft or coupling alignment values as shown above.

FIG. 7 illustrates various types of shaft or coupling alignments that can be determined using the systems and methods described in this specification. FIGS. 8A and 8B illustrate the variables used in the following discussion with reference to an example target plane 800, labelled target plane "A," of a target wheel. FIG. 8A depicts the target plane 800 and various deflections of the target plane 800. FIG. 8B shows the target plane 800 with respect to an axis to define shaft or coupling alignment values, where $X_A$, $Y_A$, $Z_A$, $\theta x_A$, and $\theta y_A$ correspond to radial alignment in the x and y direction, axial alignment and angular alignments, respectively, for the target plane "A." This labelling process can be repeated for a different "B" target wheel where $X_B$, $Y_B$, $Z_B$, $\theta x_B$, and $\theta y_B$ are the variables corresponding to the target wheel motions.

To further illustrate the alignment values $Z_A$ and $R_0$, consider the following. Referring to FIG. 8A, in the exact geometric center of the target wheel 800, there is a point ($\Delta x_A$, $\Delta y_A$), and with no motion ($X_A$, $Y_A$, $Z_A$, $\theta x_A$, and $\theta y_A$=0) this point lies on the z-axis. As the target wheel moves, this point will displace and if some displacement is in the axial direction, $Z_A$ is no longer equal to 0. $R_0$ is the articulation radius of the coupling. For two target wheels, consider two possible scenarios: one, the target wheels are on a stiff shaft, and $R_0$=½ the distance between the target wheels; or two, the target wheels are on a coupling, and $R_0$ is the distance between the target wheel and the point where the normal vectors of the x-y planes of each target wheel intersect.

Referring back to FIG. 7, in each example alignment shown, two target wheels are depicted, including a first target wheel "A" on the left and a second target wheel "B" on the right. The alignment values for both target wheels can be understood from FIGS. 8A and 8B because the alignment values for the second target wheel, "B," are defined the same as those for the first target wheel, "A," which is shown in FIGS. 8A and 8B. The A and B target wheels can be on different shafts across a coupling, e.g., as illustrated in FIGS. 1A-1H, or the A and B target wheels can each be on the same shaft, e.g., as illustrated in FIGS. 9A-9D.

The alignment values shown in FIG. 7 may occur in combination. Geometric computations allow for resolution of individual shaft alignment profiles and is described further below.

A first example alignment 702 illustrates axial strain. The axial strain between the A and B targets is proportional to the following:

$$\Delta z = Z_B - Z_A - 2R_0 \quad (31)$$

where $\Delta z$ is the axial displacement measured along the z-axis, $Z_B$ is the axial displacement of target B, $Z_A$ is the axial displacement of target A, and $R_0$ is radial distance between a target A or target B and a point centered between target A or target B.

A second example alignment 704 illustrates bulk axial displacement of both target wheels together. The axial displacement of the A and B targets is determined by the following:

$$\Sigma z = (Z_B + Z_A)/2 \quad (32)$$

A third example alignment 706 illustrates parallel (or offset) misalignment and translational whirl (or runout), and a fourth example alignment 708 illustrates angular misalignment and bending whirl. The overall angular misalignment between targets A and B is the following:

$$\theta = \sqrt{(\theta_{xA} - \theta_{xB})^2 + (\theta_{yA} - \theta_{yB})^2} \quad (33)$$

The overall parallel misalignment or offset between the A and B targets is the following:

$$r = \sqrt{(X_A - X_B)^2 + (X_A - X_B)^2} \quad (34)$$

A fifth example alignment 710 illustrates run-out, and a sixth example alignment 712 illustrates twist and torsional dynamics. Run-out is radial translation that occurs synchronously with the shaft rotational speed. As twist across the shaft or coupling occurs, a phase difference can be observed between sensors on the A and B target wheels. The phase difference between two sensors can be converted to twist. FIG. 8C shows example sensor waveforms illustrating a phase difference between two sensors.

Figure 9B:
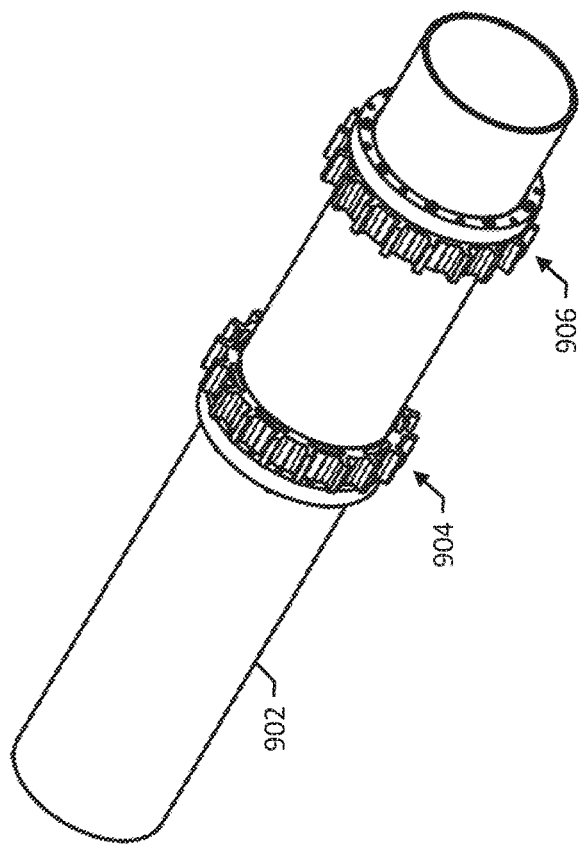
Figure 9A:
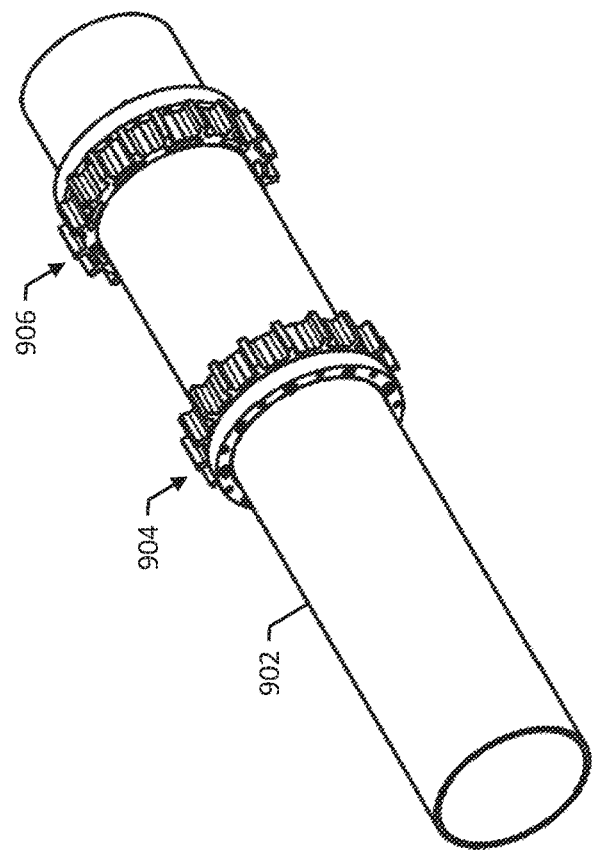

FIGS. 9A-9D illustrate an example shaft 902 having two target wheels 904, 906 on the shaft 902. FIG. 9A shows a first perspective view of the shaft 902 and the two target wheels 904, 906, and FIG. 9B shows a second perspective view of the shaft 902 and the two target wheels 904, 906. FIG. 9C is a side view of the shaft 902 and the two target wheels 904, 906. FIG. 9D is a cross-sectional view of the shaft 902 the two target wheels 904, 906. Placing two target wheels on the same shaft 902 can be useful, e.g., to measure the same variables described above with reference to couplings, but across different portions of the same shaft 902 instead of across a coupling.

FIG. 10 is a flow diagram of an example method 1000 performed by a controller of a measurement system, e.g., the controller 202 of FIG. 2. The method 1000 includes receiving sensor signals from sensors mounted radially around a shaft on a sensor array (1002). The sensors are oriented to a target wheel, e.g., as described above with reference to FIGS. 1A-1H and FIGS. 9A-9D. The method 1000 includes determining, based on the sensor signals, at least an axial displacement measurement of the shaft and a radial displacement measurement of the shaft (1004). The method 1000 optionally includes transmitting feedback to a signal interface comprising real-time feedback parameters or structural health indicators, e.g., as described above with reference to FIGS. 1A-1H and FIG. 2 (1006).

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A measurement system comprising:
a shaft extended in a longitudinal direction;
a target wheel configured to rotate with the shaft, wherein the target wheel comprises a plurality of sensor targets circumferentially distributed around the target wheel, and wherein the plurality of sensor targets includes a first plurality of targets that are slanted in the longitudinal direction and a second plurality of targets that are parallel to the longitudinal direction, said first plurality of targets includes at least a first slanted target slanted in an opposite direction, in the longitudinal direction, to at least a second slanted target;
a sensor array comprising at least three sensors mounted radially around the shaft and configured to detect the plurality of sensor targets as the target wheel rotates with the shaft; and
a controller configured to receive sensor signals from the at least three sensors and determine, based on the sensor signals, at least an axial displacement measurement of the shaft in the longitudinal direction and a radial displacement measurement of the shaft.

2. The measurement system of claim 1, wherein the controller is configured to determine the axial displacement measurement of the shaft based on a relative timing difference between detecting the first plurality of targets and the second plurality of targets.

3. The measurement system of claim 1, wherein each sensor of the at least three sensors comprises an optical sensor.

4. The measurement system of claim 1, wherein the first plurality of targets and the second plurality of targets are disposed radially around the target wheel in an alternating fashion.

5. The measurement system of claim 1, further comprising a second target wheel configured to rotate with the shaft, wherein the target wheel comprises a plurality of sensor targets circumferentially distributed around the target wheel and a second sensor array comprising at least three sensors mounted radially around the shaft and configured to detect the plurality of sensor targets as the second target wheel rotates with the shaft.

6. The measurement system of claim 5, wherein the controller is configured to determine a twist measurement of the shaft using a mean timing difference between detecting the sensor targets on the target wheel and the second target wheel.

7. The measurement system of claim 5, wherein the controller is configured to determine one or more or all of: axial strain, axial displacement, parallel misalignment, angular misalignment, run-out, and twist.

8. The measurement system of claim 5, wherein the controller is configured to transmit a safety critical feedback or one or more structural health indicators to a signal interface.

9. The measurement system of claim 8, wherein the target wheel and the sensor array are located at a first end of a rotational coupling that is coupled to the shaft, and the second target wheel and second sensor array are located at a second end of the rotational coupling, opposite the first end in the longitudinal direction, that is coupled to a different shaft, and wherein the controller is configured to determine the one or more structural health indicators of the rotational coupling based on the sensor signals from the sensor array and second sensor signals from the second sensor array.

10. The measurement system of claim 1, wherein each sensor target of the plurality of sensor targets comprises one or more of: a conductive target, an optical target, and a ferrous target.

11. The measurement system of claim 1, wherein the plurality of sensor targets is uniformly spaced circumferentially around the target wheel.

12. The measurement system of claim 1, wherein each sensor of the at least three sensors comprises a variable reluctance sensor.

13. The measurement system of claim 1, wherein each sensor of the at least three sensors comprises a non-contact active inductive proximity sensor or a non-contact capacitive proximity sensor.

14. A method performed by a controller of a measurement system, the method comprising:
receiving sensor signals from each of at least three sensors mounted radially around a shaft on a sensor array, wherein the shaft is extended in a longitudinal direction, and wherein the sensor array is configured to position the at least three sensors for detecting a plurality of sensor targets circumferentially distributed around a target wheel as the target wheel rotates with the shaft, wherein the plurality of sensor targets includes a first plurality of targets that are slanted in the longitudinal direction and a second plurality of targets that are parallel to the longitudinal direction and said first plurality of targets includes at least a first slanted target slanted in an opposite direction, in the longitudinal direction, to at least a second slanted target; and
determining, based on the sensor signals, at least an axial displacement measurement of the shaft in the longitudinal direction and a radial displacement measurement of the shaft.

15. The method of claim 14, wherein determining the axial displacement measurement of the shaft in the longitudinal direction comprises determining the axial displacement measurement based on a relative timing difference between detecting the first plurality of targets and the second plurality of targets.

16. The method of claim 15, wherein the first plurality of targets is slanted at a slant angle in the longitudinal direction, the method comprising determining the relative timing distance using the slant angle, a radius of the plurality of targets, and a total number of targets on the target wheel.

17. The method of claim 14, comprising determining a twist measurement and the axial displacement measurement by applying a moving average filter to the sensor signals.

18. The method of claim 14, comprising determining a twist measurement of the shaft using a mean timing distance between detecting the sensor targets.

19. The method of claim 14, comprising determining the one or more or all of: axial strain, axial displacement, parallel misalignment, angular misalignment, run-out, and twist.

20. The method of claim 14, comprising transmitting safety critical feedback or one or more structural health indicators to a signal interface.

\* \* \* \* \*